US012661766B2

(12) United States Patent
Neuhoff et al.

(10) Patent No.: US 12,661,766 B2
(45) Date of Patent: Jun. 23, 2026

(54) POWERED FASTENER DRIVER

(71) Applicant: MILWAUKEE ELECTRIC TOOL CORPORATION, Brookfield, WI (US)

(72) Inventors: Mitchell T. Neuhoff, Waukesha, WI (US); Bradley S. Houskamp, Wauwatosa, WI (US); Mark C. Hughes, Waukesha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/678,033

(22) Filed: May 30, 2024

(65) Prior Publication Data

US 2024/0399549 A1 Dec. 5, 2024

Related U.S. Application Data

(60) Provisional application No. 63/593,695, filed on Oct. 27, 2023, provisional application No. 63/505,584, filed on Jun. 1, 2023.

(51) Int. Cl.

| | |
|---|---|
| ***B25C 1/00*** | (2006.01) |
| ***B25C 1/04*** | (2006.01) |
| ***B25C 1/06*** | (2006.01) |

(52) U.S. Cl.

CPC .............. *B25C 1/008* (2013.01); *B25C 1/003* (2013.01); *B25C 1/047* (2013.01); *B25C 1/06* (2013.01)

(58) Field of Classification Search

CPC ........... B25C 1/008; B25C 1/003; B25C 1/04; B25C 1/041; B25C 1/047; B25C 1/06; B25C 1/001; B25C 1/005; B25C 1/188; B25C 5/15; B25C 5/1689; B25C 7/00

See application file for complete search history.

(56) References Cited

U.S. PATENT DOCUMENTS

| | | | |
|---|---|---|---|
| 5,230,457 | A | 7/1993 | Hiroi et al. |
| RE36,923 | E | 10/2000 | Hiroi et al. |
| 6,607,111 | B2 | 8/2003 | Garvis et al. |
| 6,669,072 | B2 | 12/2003 | Burke et al. |
| 6,739,490 | B1 | 5/2004 | Shkolnikov et al. |
| 6,755,336 | B2 | 6/2004 | Harper et al. |

(Continued)

FOREIGN PATENT DOCUMENTS

| | | |
|---|---|---|
| CN | 205363784 U | 7/2016 |
| CN | 218397956 U | 1/2023 |

(Continued)

*Primary Examiner* — Veronica Martin

(74) *Attorney, Agent, or Firm* — Michael Best & Friedrich LLP

(57) ABSTRACT

A powered fastener driver includes a housing, a nosepiece extending from the housing, a driver blade movable within the nosepiece between a ready position and a driven position, a piston coupled to the driver blade for movement therewith, a driver cylinder within which the piston is movable, a magazine coupled to the nosepiece in which collated fasteners are receivable, a fastener delivery mechanism coupled to the nosepiece for individually transferring collated fasteners in the magazine to a fastener driving channel in the nosepiece, the fastener delivery mechanism movable between a fastener retrieval position and a fastener delivered position, and a sensor for determining a position of the fastener delivery mechanism.

20 Claims, 22 Drawing Sheets

(56) References Cited

U.S. PATENT DOCUMENTS

| | | | |
|---|---|---|---|
| 6,796,475 | B2 | 9/2004 | Adams |
| 6,796,476 | B2 | 9/2004 | Birk et al. |
| 6,974,061 | B2 | 12/2005 | Adams et al. |
| 7,137,541 | B2 | 11/2006 | Baskar et al. |
| 7,285,877 | B2 | 10/2007 | Gorti et al. |
| 8,061,574 | B2 | 11/2011 | Lesser et al. |
| RE43,041 | E | 12/2011 | Adams et al. |
| 8,286,722 | B2 | 10/2012 | Leimbach et al. |
| 8,347,978 | B2 | 1/2013 | Forster et al. |
| 8,408,327 | B2 | 4/2013 | Forster et al. |
| 8,434,566 | B2 | 5/2013 | Forster et al. |
| 9,533,408 | B2 | 1/2017 | Forster et al. |
| 10,040,180 | B2 | 8/2018 | Foser |
| 10,946,504 | B1 | 3/2021 | Pedicini et al. |
| 10,987,766 | B2 | 4/2021 | MacDougall et al. |
| 11,247,320 | B2 | 2/2022 | Li et al. |
| 11,292,114 | B2 | 4/2022 | Pedicini et al. |
| 11,358,262 | B2 | 6/2022 | Pedicini et al. |
| 11,383,366 | B2 | 7/2022 | Pedicini et al. |
| 11,724,375 | B2 | 8/2023 | Ootsuka |
| 2002/0185514 | A1 | 12/2002 | Adams et al. |
| 2019/0224825 | A1 | 7/2019 | Pedicini et al. |
| 2020/0030954 | A1* | 1/2020 | Wolf .......................... B25C 1/00 |
| 2021/0170559 | A1 | 6/2021 | Dittrich et al. |
| 2021/0220981 | A1 | 7/2021 | Dittrich et al. |
| 2021/0229251 | A1 | 7/2021 | Dittrich et al. |
| 2021/0387317 | A1 | 12/2021 | Dittrich |
| 2022/0297276 | A1* | 9/2022 | Moloznik ............... B25C 1/008 |
| 2023/0050358 | A1 | 2/2023 | Shelton, IV et al. |
| 2023/0264332 | A1 | 8/2023 | Neuhoff et al. |
| 2023/0381937 | A1* | 11/2023 | Tago ....................... B25C 1/047 |

FOREIGN PATENT DOCUMENTS

| | | | |
|---|---|---|---|
| CN | 218639558 | U | 3/2023 |
| DE | 4405648 | A1 | 8/1995 |
| DE | 4405661 | A1 | 8/1995 |
| WO | 2019233844 | A1 | 12/2019 |

* cited by examiner

POWERED FASTENER DRIVER

CROSS-REFERENCE TO RELATED APPLICATIONS

This application claims priority to U.S. Provisional Patent Application No. 63/593,695 filed on Oct. 27, 2023 and U.S. Provisional Patent Application No. 63/505,584 filed on Jun. 1, 2023, the entire contents of both of which are incorporated herein by reference.

FIELD OF THE INVENTION

The present invention relates to powered fastener drivers.

BACKGROUND OF THE INVENTION

Powered fastener drivers are used for driving fasteners (e.g., nails, tacks, staples, etc.) into a workpiece. Such fastener drivers typically include a magazine in which the fasteners are stored and a pusher mechanism for individually transferring fasteners from the magazine to a fastener driving channel, where the fastener is impacted by a driver blade during a fastener driving operation.

SUMMARY OF THE INVENTION

The present invention provides, in one aspect, a powered fastener driver having a housing, a nosepiece extending from the housing, a driver blade movable within the nosepiece between a ready position and a driven position, a piston coupled to the driver blade for movement therewith, a driver cylinder within which the piston is movable, a magazine coupled to the nosepiece in which collated fasteners are receivable, a fastener delivery mechanism coupled to the nosepiece for individually transferring collated fasteners in the magazine to a fastener driving channel in the nosepiece, the fastener delivery mechanism movable between a fastener retrieval position and a fastener delivered position, and a sensor for determining a position of the fastener delivery mechanism.

The present invention provides, in another aspect, a method of operating a powered fastener driver and the method includes monitoring a position of a fastener delivery mechanism, determining whether the fastener delivery mechanism has moved from a fastener retrieval position to a fastener delivered position, and allowing the fastener driver to fire when the trigger is actuated and when the fastener delivered position is detected.

The present invention provides, in still another aspect, a powered fastener driver having a housing, a nosepiece extending from the housing, a workpiece contact bracket slidably disposed on the nosepiece, the workpiece contact bracket including at least one workpiece contact bracket target, a driver blade movable within the nosepiece between a ready position and a driven position, a piston coupled to the driver blade for movement therewith, a driver cylinder within which the piston is movable, a magazine coupled to the nosepiece in which collated fasteners are receivable, a fastener delivery mechanism coupled to the nosepiece for individually transferring collated fasteners in the magazine to a fastener driving channel in the nosepiece, the fastener delivery mechanism including at least one actuator target, a first sensor for detecting movement of the at least one workpiece contact bracket target and the workpiece contact bracket, and a second sensor for detecting movement of the at least one actuator target and movement of the fastener delivery mechanism.

The present invention provides, in yet another aspect, a powered fastener driver that includes a housing, a nosepiece extending from the housing, a driver blade movable within the nosepiece between a ready position and a driven position, a piston coupled to the driver blade for movement therewith, a driver cylinder within which the piston is movable, a magazine coupled to the nosepiece in which collated fasteners are receivable, a fastener delivery mechanism coupled to the nosepiece for individually transferring collated fasteners in the magazine to a fastener driving channel in the nosepiece, the fastener delivery mechanism movable between a fastener retrieval position and a fastener delivered position, and a sensor for detecting whether a fastener is in fastener driving channel.

The present invention provides, in yet another aspect, a powered fastener driver including a housing, a nosepiece extending from the housing, a driver blade movable within the nosepiece, a piston coupled to the driver blade for movement therewith, a driver cylinder within which the piston is movable from a top dead center position (TDC) and a bottom dead center (BDC) position, a canister magazine coupled to the nosepiece in which collated fasteners are receivable, a pusher for individually transferring collated fasteners in the canister magazine to a fastener driving channel in the nosepiece, and an inductive sensor for determining a position of the pusher.

Other features and aspects of the invention will become apparent by consideration of the following detailed description and accompanying drawings.

Figure 1:
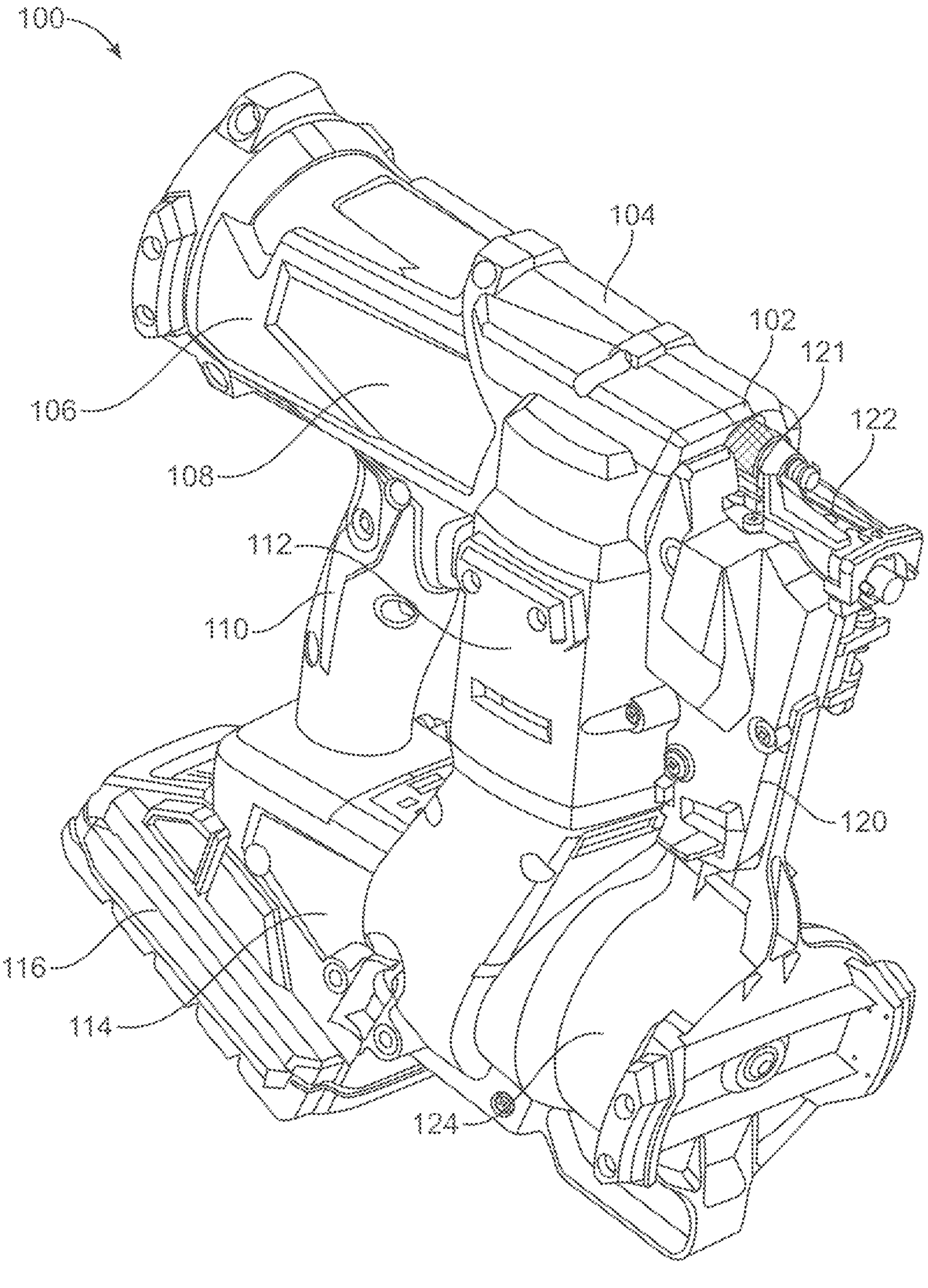
FIG. 1 is a perspective view of a gas-spring powered fastener driver.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Referring to FIGS. 1-6, an embodiment of a gas spring-powered fastener driver 100 is illustrated. The fastener driver 100 is operable to drive fasteners, such as nails from a collated roll or coil, into a workpiece. The fastener driver 100 includes a housing 102 having a first housing shell 104 joined to a second housing shell 106. The housing 102 includes a head portion 108 having a handle portion 110 and a drive unit housing portion 112 extending therefrom. The housing 102 also includes a battery receptacle portion 114 that extends from the handle portion 110 and is sized and shaped to receive a removable battery pack 116 therein. Further, the housing 102 includes a fastener delivery portion 120 that extends along the drive unit housing portion 112 from a nosepiece 121 to a magazine receptacle portion 124 adjacent the battery receptacle portion 114. A workpiece contact bracket 122 is slidably disposed on the nosepiece 121.

As shown, the magazine receptacle portion 124 is generally cylindrical and is sized and shaped to receive coiled fasteners therein. A magazine cover 126 is rotatably disposed on the housing 102 and provides access to a magazine 128 that may be removably disposed within the magazine receptacle portion 124. The magazine 128 is a canister magazine which contains a coiled strip of collated nails. Individual fasteners are sequentially loaded from the magazine 128 to the nosepiece 121 via the fastener delivery portion 120 during operation of the fastener driver 100.

Figure 2:
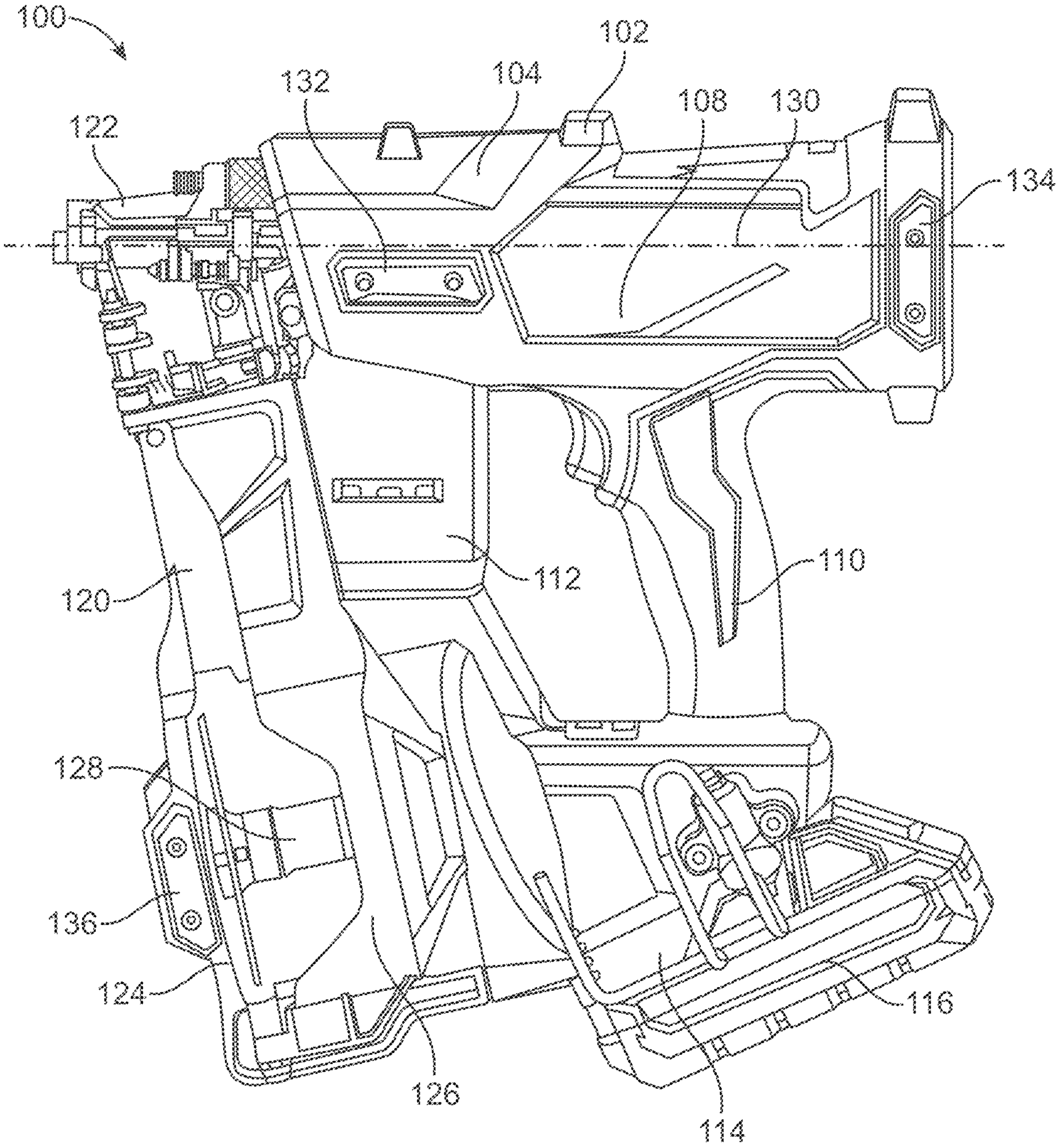
FIG. 2 is a left-side view of the gas-spring powered fastener driver of FIG. 1.

As shown in FIG. 2, the fastener driver 100 defines a driving axis 130 along which fasteners are driven from the fastener driver 100 in a workpiece. Further, as depicted, the fastener driver 100 includes a first sinister wear pad 132 that is disposed on the head portion 108 of the first housing shell 104 near the nosepiece 121. The first sinister wear pad 132 extends in a direction that is parallel to the driving axis 130. The fastener driver 100 further includes a second sinister wear pad 134 that is disposed on the head portion 108 of first housing shell 104 near the end of the head portion 108 opposite the nosepiece 121. The second sinister wear pad 134 extends in a direction that is perpendicular to the driving axis 130. As further shown in FIG. 2, the fastener driver 100 includes a third sinister wear pad 136 that is disposed on the magazine receptacle portion 124 at an angle with respect to the driving axis 130.

Figure 3:
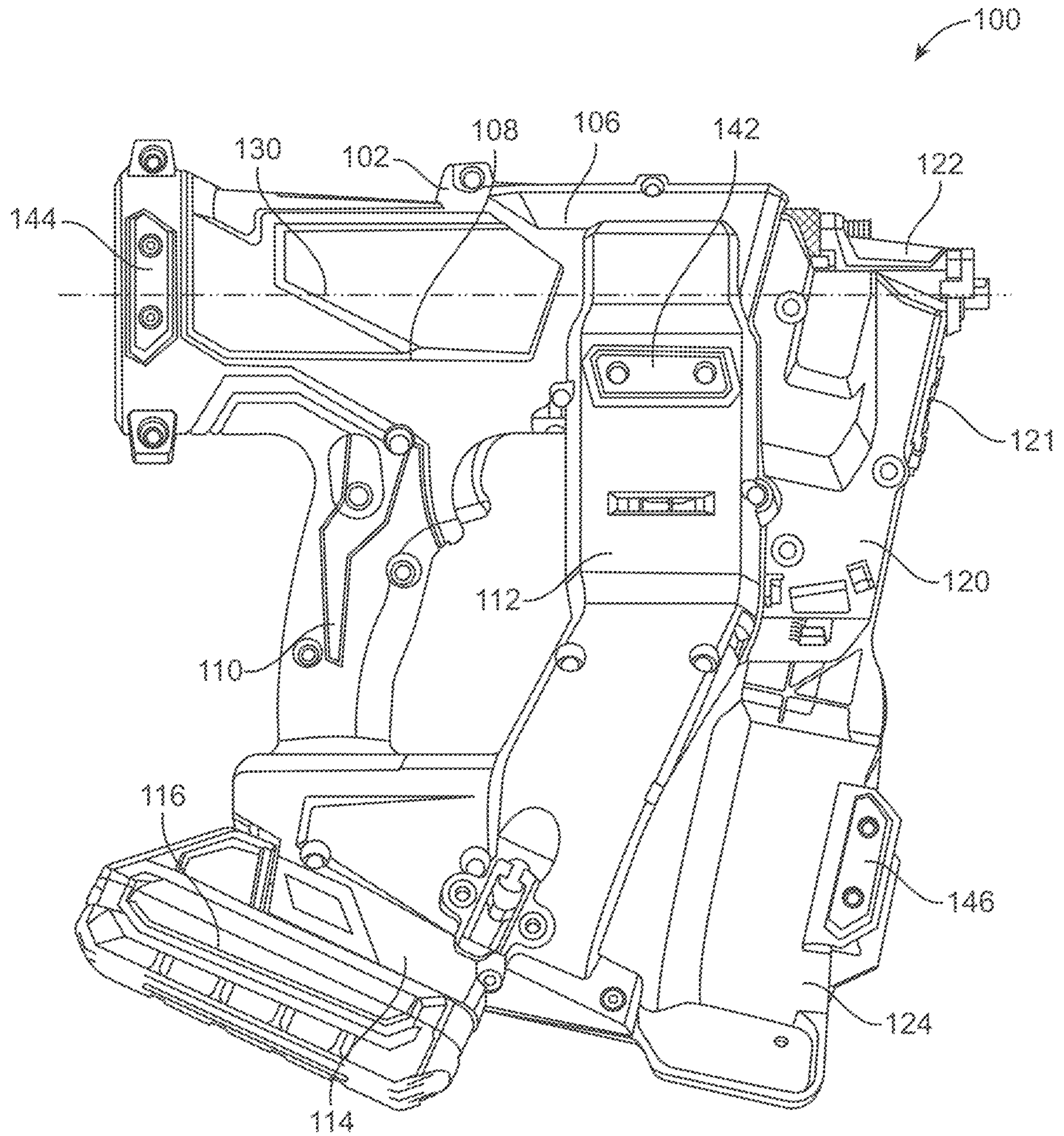
FIG. 3 is a right-side view of the fastener driver of FIG. 1.

FIG. 3 indicates that the fastener driver 100 includes a first dexter wear pad 142 that is disposed on the head portion 108 of the second housing shell 106 near the nosepiece 121. The first dexter wear pad 142 extends in a direction that is parallel to the driving axis 130. The fastener driver 100 further includes a second dexter wear pad 144 that is disposed on the head portion 108 of second housing shell 106 near the end of the head portion 108 opposite the nosepiece 121. The second dexter wear pad 144 extends in a direction that is perpendicular to the driving axis 130. As further shown in FIG. 3, the fastener driver 100 includes a third dexter wear pad 146 that is disposed on the magazine receptacle portion 124 at an angle with respect to the driving axis.

Figure 4:
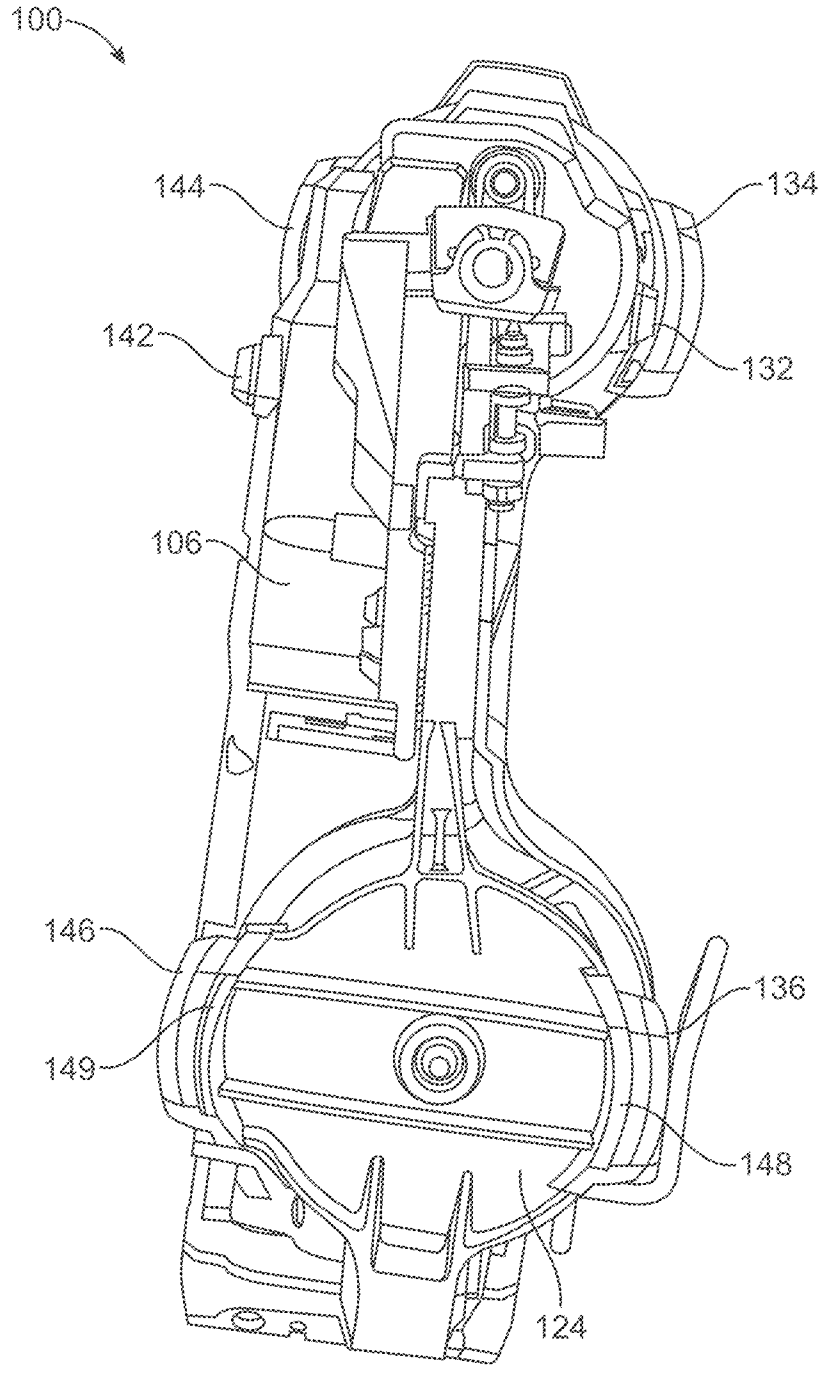
FIG. 4 is a front view of the fastener driver of FIG. 1.
Figure 5:
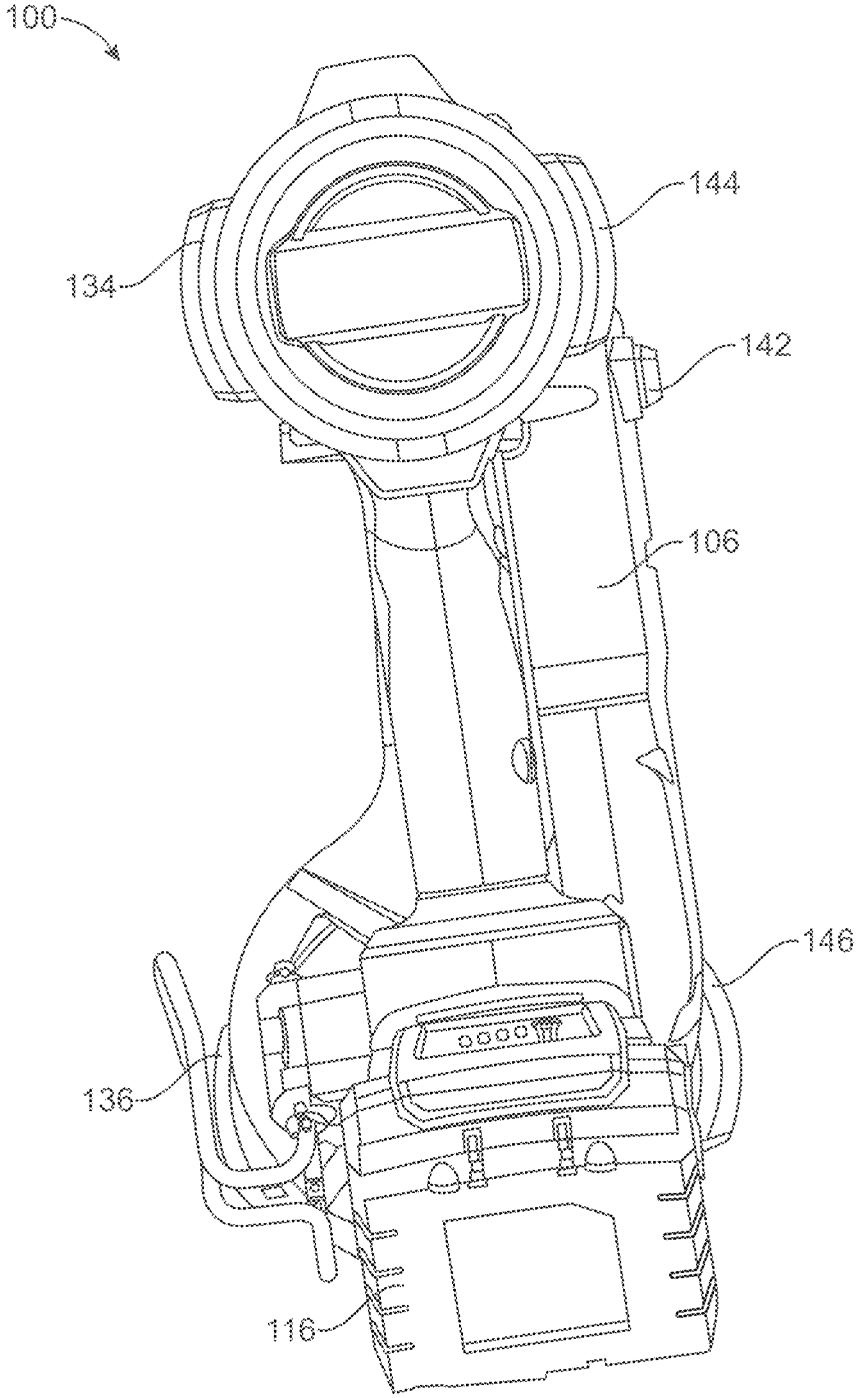
FIG. 5 is a rear view of the fastener driver of FIG. 1.
Figure 6:
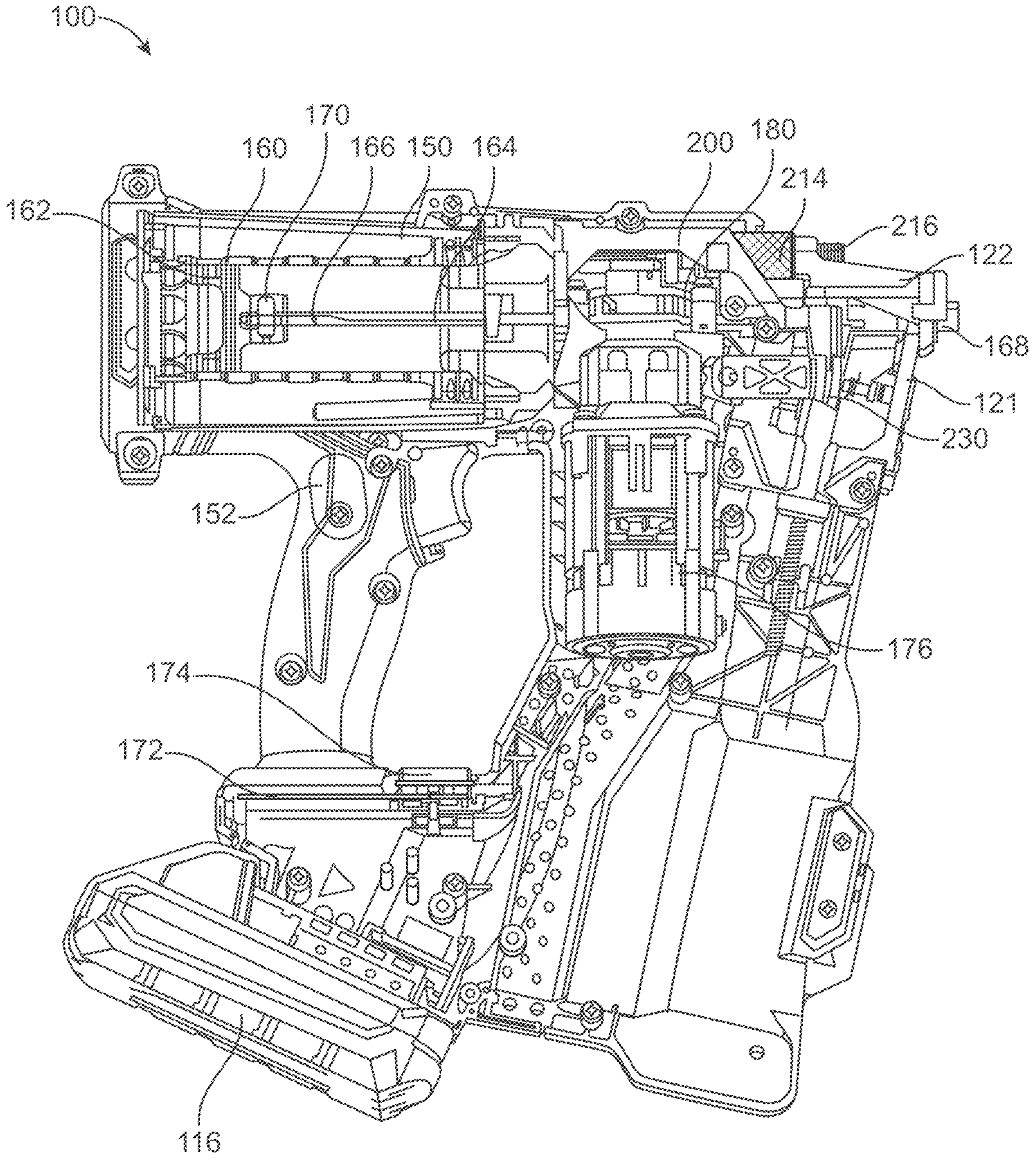
FIG. 6 is a right-side view of the fastener driver of FIG. 1 with a portion of the housing removed and with a partial cross-section through a storage chamber cylinder.

As shown in FIG. 4, the fastener driver 100 further includes a first abrasion resistant plate 148 adjacent the third sinister wear pad 136 and a second abrasion resistant plate 149 adjacent the third dexter wear pad 146. The abrasion resistant plates 148, 149 are molded into the magazine receptacle portion 124 so that they face in a forward direction, i.e., in the same direction as the nosepiece 121 and the same direction in which a fastener is driven from the fastener driver 100. The abrasion resistant plates 148, 149 are constructed from a material having a relatively high hardness and as such, a relatively high resistance to wear. For example, the abrasion resistant plates 148, 149 are made from a metal such as a high-carbon alloy steel.

FIGS. 6-9 illustrate the internal components of the fastener driver 100. As shown, the fastener driver 100 includes a storage chamber cylinder 150 disposed within the head portion 108 of the housing 102. The storage chamber cylinder 150 includes a valve port 152 in which a fill valve is disposed. The fill valve is in fluid communication with the interior of the storage chamber cylinder 150. For example, the fill valve may be configured as a Schrader valve, a Presta valve, a Dunlop valve, or some other similar valve. When connected with a source of compressed gas, the fill valve enables the storage chamber cylinder 150 to be filled with compressed gas or refilled with compressed gas if any leakage occurs.

The storage chamber cylinder 150 includes a driver cylinder 160 disposed therein. Further, a movable piston 162 is slidably disposed within the driver cylinder 160. A driver blade 164 is connected to the movable piston 162. As shown, the driver blade 164 includes a proximal end 166 and a distal end 168. The proximal end 166 of the driver blade 164 is connected to the movable piston 162 via a pin 170. The distal end 168 of the driver blade 164 is located adjacent the nosepiece 121 when the piston 162 is moved to a top dead center (TDC) (i.e., retracted or ready) position within the driver cylinder 160 and the fastener driver 100 is ready to be fired. Upon firing, the distal end 168 of the driver blade 164 is moved into the nosepiece 121 to drive a fastener from within the nosepiece 121 and into a workpiece until the piston 162 reaches a bottom dead center (BDC) (i.e., extended or driven) position within the driver cylinder 160.

FIGS. 6-9 further indicate that the fastener driver 100 includes a circuit board 172 that controls the operation of the fastener driver 100. A user interface 174 is disposed on the circuit board 172 and extends through the housing 102 into an area near the handle portion 110. The user interface 174 provides the user controls for the fastener driver 100 and includes, for example, an on/off switch, a mode selector button, a remaining charge indicator, a charging indicator, and other additional buttons and indicators, as necessary. The circuit board 172 is electrically connected to the battery receptacle portion 114 and the battery pack 116 when engaged therewith and provides DC power to a motor 176 (e.g., a brushless direct current (BLDC) motor) that is operably coupled to a lifting mechanism 180. The lifting mechanism 180 selectively engages the driver blade 164 and the lifting mechanism 180 is driven by the motor 176 to move the driver blade 164 from a driven or BDC position to a ready position (between the BDC and TDC positions) prior to a subsequent fastener driving operation. In response to initiating a subsequent fastener driving operation, the motor 176 is reactivated to cause the lifting mechanism 180 to move the driver blade 164 from the ready position to the TDC position, whereafter the lifting mechanism 180 disengages the driver blade 164 which is then thrust toward the driven or BDC position by the force of the compressed gas acting on the piston 162. A latch actuator assembly 190, best shown in FIGS. 7 and 9, cooperates with the lifting mechanism 180 to selectively engage the driver blade 164 and hold the driver blade 164 in a ready position before the latch actuator assembly 190 is actuated by the lifting mechanism 180 to release the driver blade 164 into the nosepiece 121 to drive a fastener from the fastener driver 100 and into a workpiece.

As further depicted in FIGS. 6-9, the fastener driver 100 further includes a sensor bracket 200 disposed at least partially above the lifting mechanism 180. The sensor bracket 200 includes a first sensor 202 configured to sense an angular (or rotational) position of the lifting mechanism 180, a second sensor 204 to sense a linear position of a workpiece contact bracket 122 that is slidably disposed on the nosepiece 121, and a third sensor 206 to sense the position of a fastener delivery mechanism 230, described below. For example, the sensors 202, 204, 206 are Hall-effect sensors that are configured to sense magnets or the presence of magnetic fields. The workpiece contact bracket 122 includes a magnet 212 that is sensed by the second sensor 204 when the workpiece contact bracket 122 is engaged with a workpiece and slides on the nosepiece 121. When the magnet 212 is sensed, the fastener driver 100 is allowed to fire. If the magnet 212 on the workpiece contact bracket 122 is not sensed, the fastener driver is not allowed to fire. The fastener delivery mechanism 230 also includes a magnet 214. If the magnet 214 on the fastener delivery mechanism 230 is not sensed, indicating the fastener delivery mechanism 230 is not properly positioned—likely due to a jammed fastener—the fastener driver 100 is not allowed to fire.

As shown, the fastener driver 100 includes a depth adjuster 220 having a threaded shaft 222 that is threadably engaged with the workpiece contact bracket 122. The depth adjuster 220 is rotatable to change a linear position of the workpiece contact bracket 122 relative to the nosepiece 121. This changes the depth to which a fastener expelled from the fastener driver 100 is driven into a workpiece.

Figure 8:
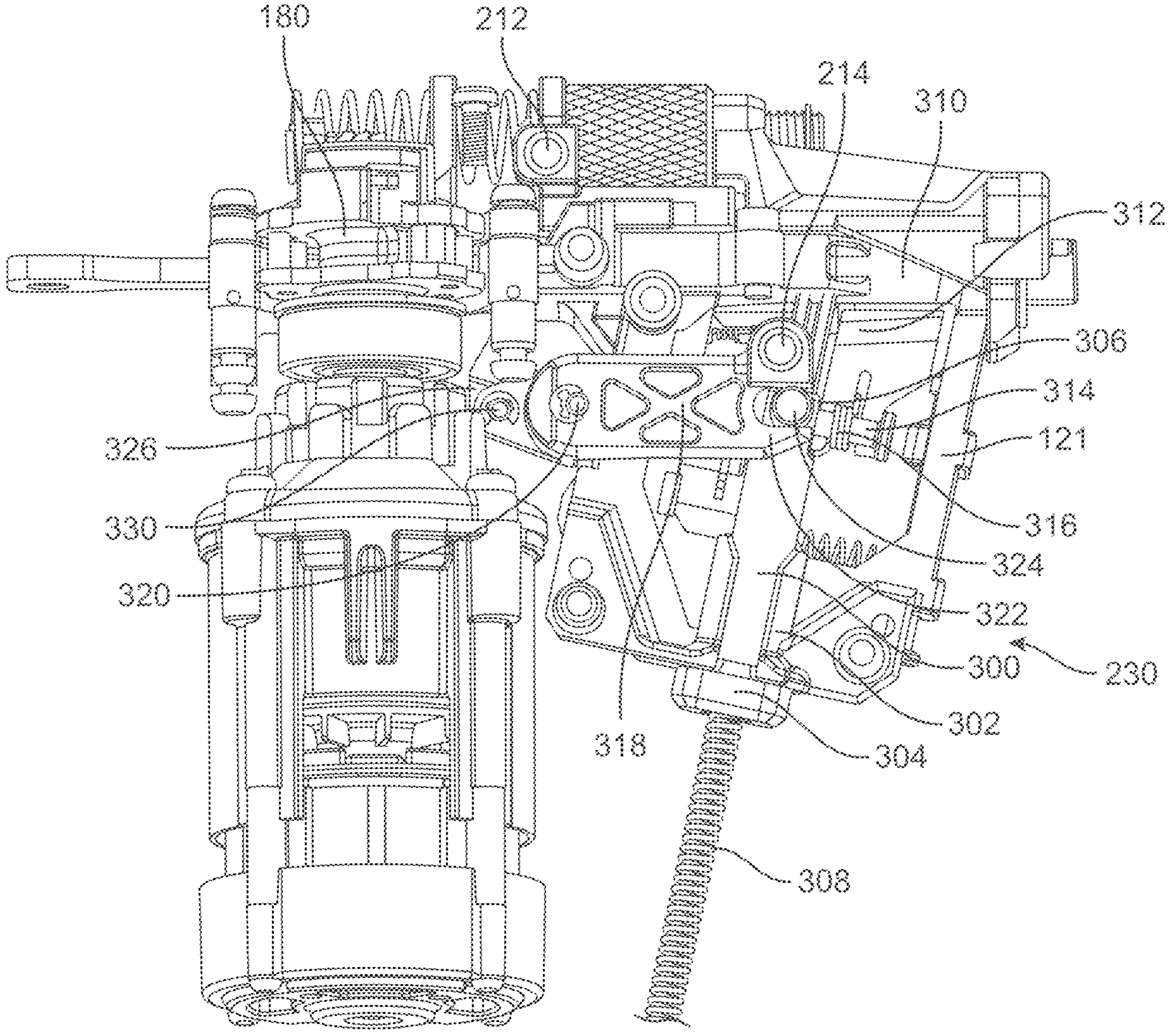
FIG. 8 is a left-side view of the fastener driver of FIG. 1 with the housing and other parts removed.
Figure 9:
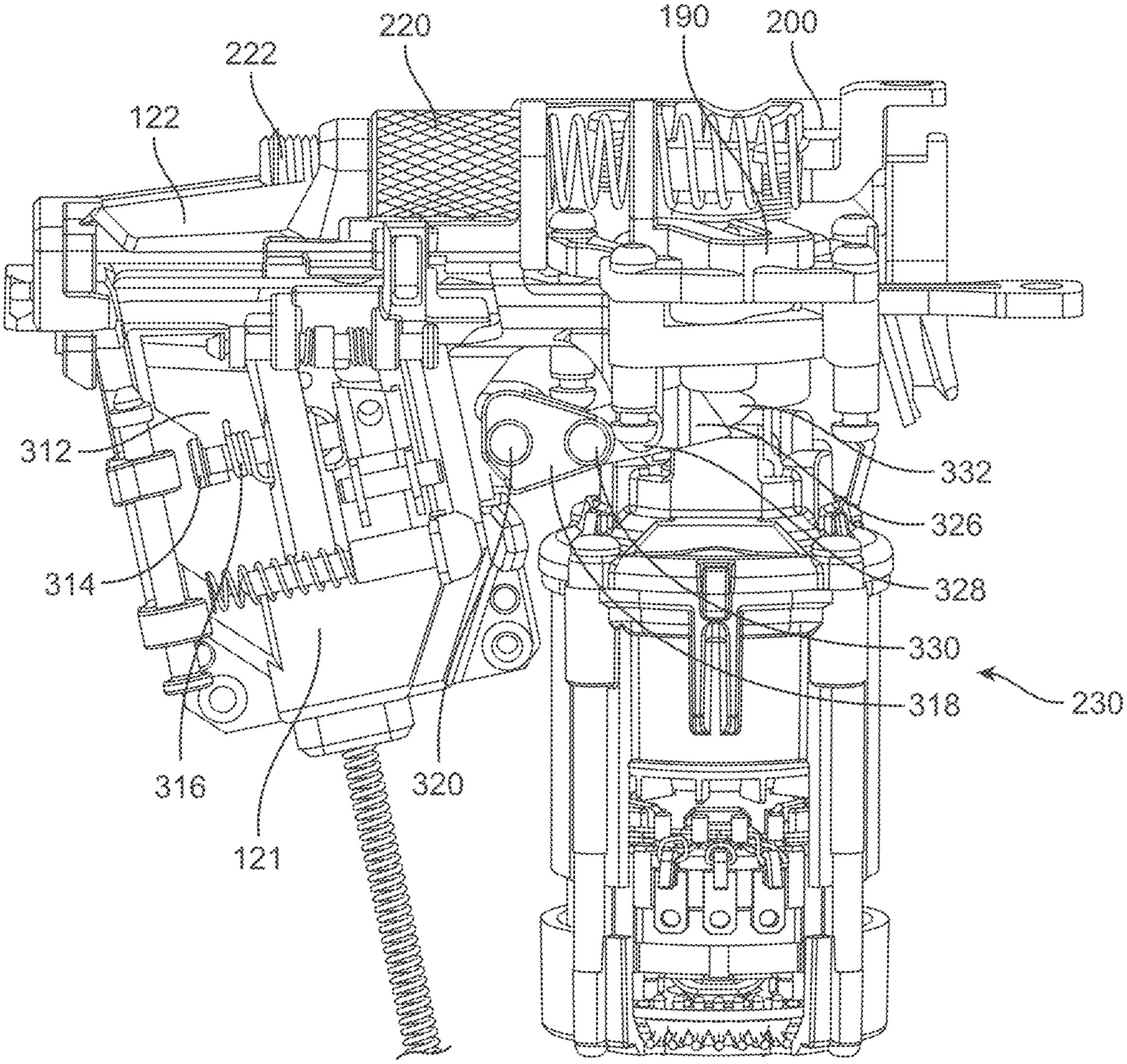
FIG. 9 is a right-side view of the fastener driver of FIG. 1 with the housing and other parts removed.

As illustrated, the fastener driver 100 also includes a fastener delivery mechanism 230. As best shown in FIGS. 8-9, the fastener delivery mechanism 230 includes a spring-loaded actuator portion 300 that is slidably disposed within a bracket 302 on the nosepiece 121. The actuator portion 300 includes a proximal end 304 and a distal end 306. A spring 308 is installed in compression adjacent the proximal end 304 of the actuator portion 300 to bias the actuator portion 300 toward a driving channel 310 of the nosepiece 121. An advancer portion 312 (i.e., a pusher) is mounted on the distal end 306 of the actuator portion 300 via a hinge pin 314. In another aspect, the advancer portion 312 and the actuator portion 300 are formed integrally as a single monolithic part and the advancer portion 312 is formed on the actuator portion 300, e.g., the distal end 306 of the actuator portion 300. A torsional spring 316 is disposed on the hinge pin 314 to bias the advancer portion 312 around the hinge pin 314 toward the nosepiece 121.

The fastener delivery mechanism 230 further includes a first rocker arm 318 rotatably mounted on the nosepiece 121 via a first post 320 (e.g., a threaded fastener). The first rocker arm 318 includes a forked end 322 that fits around a lateral post 324 on the distal end 306 of the actuator portion 300. As shown, the fastener delivery mechanism 230 also includes a second rocker arm 326 rotatably mounted on the nosepiece 121 via a second post 328 and mounted to the first rocker arm 318 via a third post 330. A spring-loaded actuator 332 is installed on a free end of the second rocker arm 326. The spring-loaded actuator 332 may only rotate in a single direction toward the delivery end of the fastener driver 100 against the force of a spring which returns it to an upright position. As the driver blade 164 is returned to the TDC position, a tooth on the driver blade 164 engages the spring-loaded actuator 332 to actuate the fastener delivery mechanism 230 and move a fastener into the driving channel 310 of the nosepiece 121 to be fired when the trigger is pulled.

FIG. 8 indicates that the first rocker arm 318 includes a pocket 340 in which the magnet 214 is disposed. As the first rocker arm 318 rotates clockwise, the first rocker arm 318 moves the advancer portion 312 in a first direction, e.g., in a downward direction away from the nosepiece 121, along a band of collated fasteners, the fastener delivery mechanism 230 moves to a fastener retrieval position. In the fastener retrieval position, the magnet 214 is moved away from the third sensor 206 and is no longer detected by the third sensor 206. When the first rocker arm 318 rotates clockwise and the advancer portion 312 moves in a second direction, e.g., in an upward direction toward the nosepiece 121, as the actuator portion 300 is fully extended, the advancer portion 312 moves a retrieved fastener into the driving channel 310 of the nosepiece 121 and the fastener delivery mechanism 230 moves to a fastener delivered position. In the fastener delivered position, the magnet 214 is detected by the third sensor 206 and the fastener driver 100 is allowed to fire. Specifically, the circuit board 172, i.e., the electronic control unit, of the fastener driver 100 receives an input from the third sensor 206, when the presence of magnet 214 is detected, that indicates that a fastener is properly loaded into the fastener driving channel 310. Thereafter, the circuit board 172 activates the motor 176 in response to the workpiece contact bracket 122 being retracted, or depressed onto a workpiece, and the trigger being pulled.

If the magnet 214 is not detected by the third sensor 206, the fastener in the advancer portion 312 is not fully delivered and a jam is likely to occur if the fastener driver 100 is allowed to fire. As such, if the magnet 214 on the first rocker arm 318 is not detected, the fastener driver 100 is not allowed to fire. Specifically, the circuit board 172, i.e., the electronic control unit, of the fastener driver 100 receives an input from the third sensor 206, when the presence of the magnet 214 is not detected, that indicates that a fastener is not properly loaded into the fastener driving channel 310. As such, the circuit board 172 will not activate the motor 176 if the workpiece contact bracket 122 is retracted and the trigger is pulled.

Figure 7:
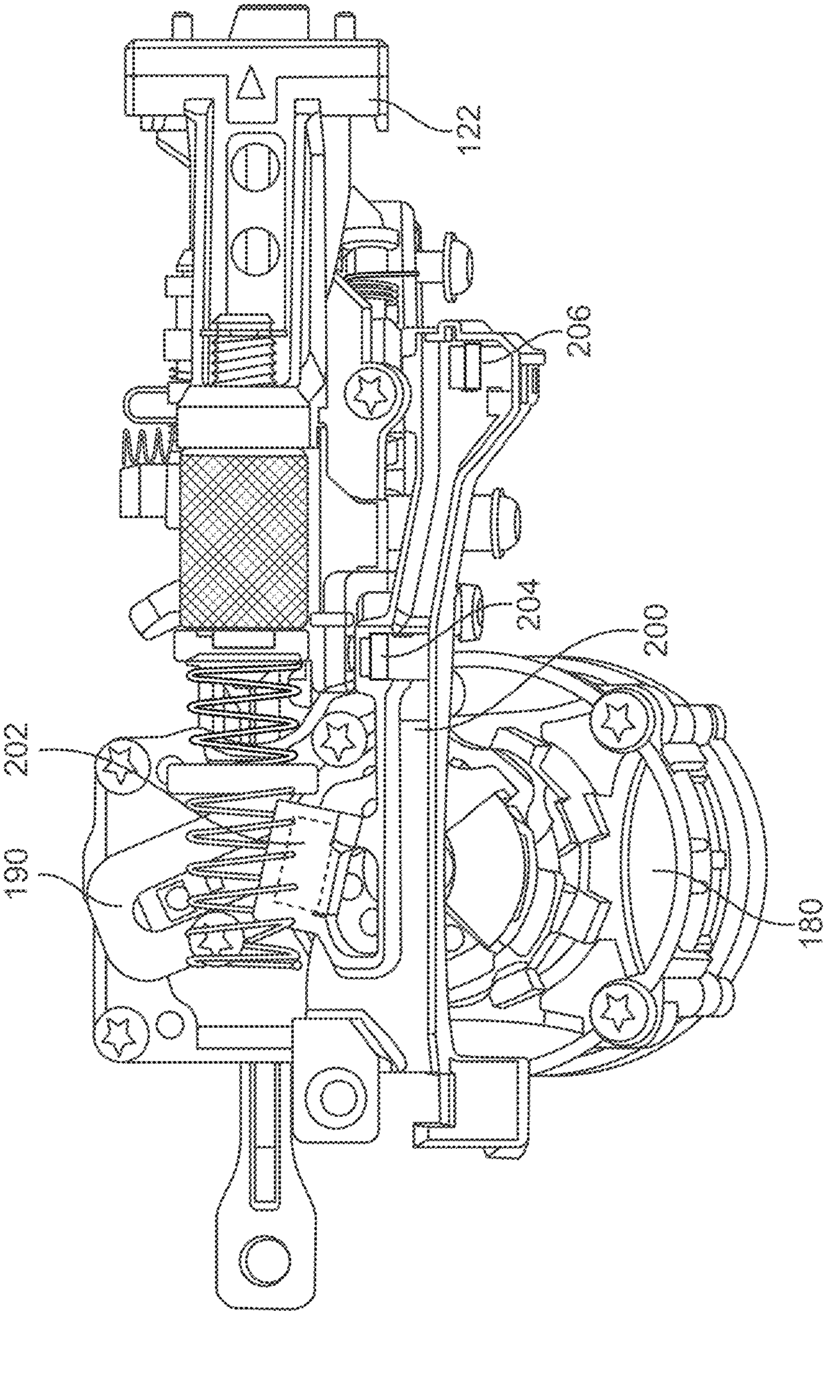
FIG. 7 is a top view of the fastener driver of FIG. 1 with the housing and other parts removed.
Figure 10:
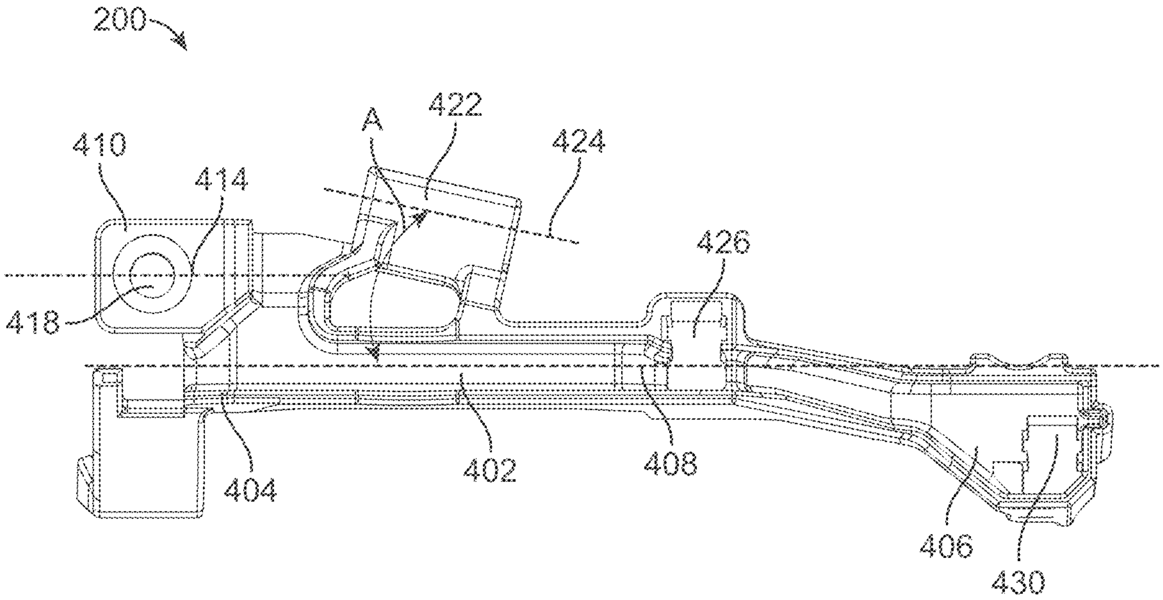
FIG. 10 is a top view of a sensor bracket for the fastener driver of FIG. 1.
Figure 11:
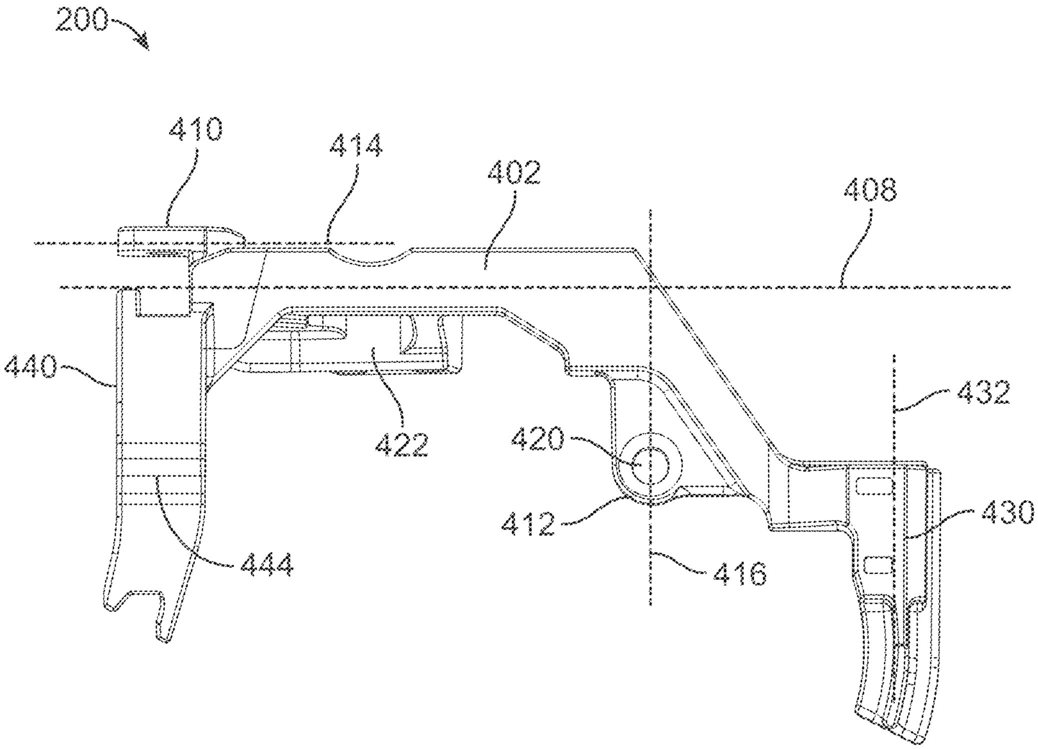
FIG. 11 is a right-side view of the sensor bracket of FIG. 10.
Figure 12:
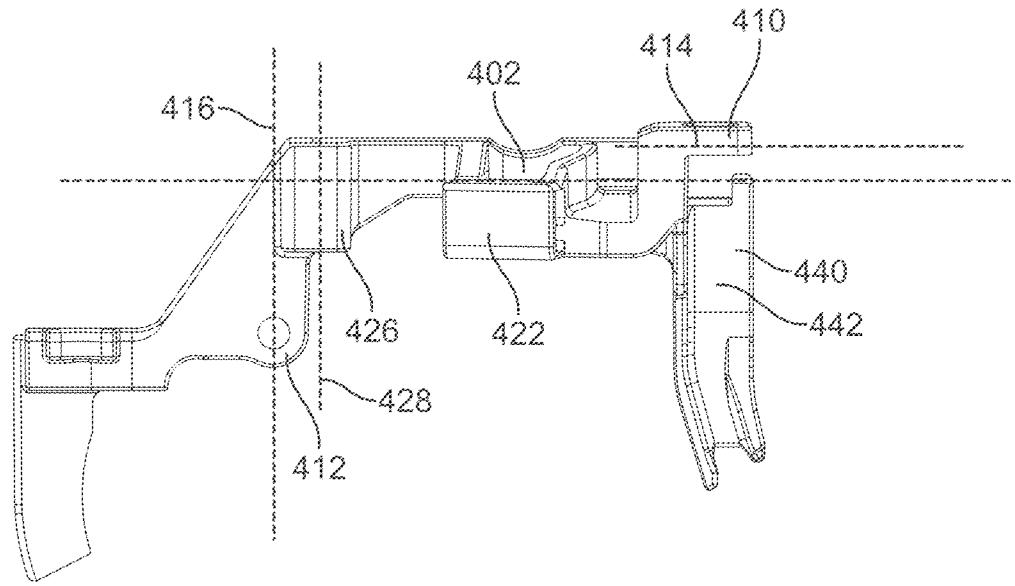
FIG. 12 is a left-side view of the sensor bracket of FIG. 10.

Referring to FIGS. 10-12, the details of the sensor bracket 200 are shown. As previously indicated, the sensor bracket 200 is configured to hold the first sensor 202, the second sensor 204, and the third sensor 206 as shown in FIG. 7. As illustrated in FIGS. 10-12, the sensor bracket 200 includes an elongated body 402 having a first end 404 and a second end 406. The elongated body 402 of the sensor bracket 200 defines a longitudinal axis 408. A first mounting tab 410 extends from the elongated body 402 near the first end 404. A second mounting tab 412 extends from the elongated body 402 near the midpoint of the elongated body 402 between the midpoint and the second end 406. As shown, the first mounting tab 410 defines a longitudinal axis 414 that is parallel to the longitudinal axis 408 of the elongated body 402 of the sensor bracket 200. The second mounting tab 412 defines a longitudinal axis 416 that is perpendicular to the longitudinal axis 408 of the elongated body 402. As shown, the mounting tabs 410, 412 are formed with holes 418, 420 to allow fasteners to extend therethrough to mount the sensor bracket 200 within the housing 102 of the fastener driver 100.

FIGS. 10-12 further show that the sensor bracket 200 includes a first sensor pocket 422 formed near a midpoint of the elongated body 402 between the midpoint and the first end 404. The first sensor pocket 422 is configured to receive the first sensor 202 therein. Further, the first sensor pocket 422 is oriented so that a longitudinal axis 424 of the first sensor pocket 422 is at an acute angle A with respect to the longitudinal axis 408 of the elongated body 402. Also, the first sensor pocket 422 and the first sensor 202 disposed therein are parallel to the first mounting tab 410. In a particular aspect, the acute angle A is greater than or equal to 5.0°, such as greater than or equal to 6.0°, greater than or equal to 7.0°, greater than or equal to 8.0°, greater than or equal to 9.0°, greater than or equal to 10.0°, greater than or equal to 11.0°, or greater than or equal to 12.0°. Further, the angle A is less than or equal to 20.0°, such as less than or equal to 19.0°, less than or equal to 18.0°, less than or equal to 17.0°, less than or equal to 16.0°, less than or equal to 15.0°, less than or equal to 14.0°, or less than or equal to 13.0°. It is to be understood that the angle A may be within a range between, and including, any of the maximum and minimum values of A disclosed herein.

The sensor bracket 200 also includes a second sensor pocket 426 near the midpoint of the elongated body 402 between the midpoint and the second end 406 and near the second mounting tab 412. As shown, the second sensor pocket 426 is configured to receive the second sensor 204 therein. Further, the second sensor pocket 426 is oriented so that a longitudinal axis 428 of the second sensor pocket 426 is perpendicular to the longitudinal axis 408 of the elongated body 402. In addition, the second sensor pocket 426 and the second sensor 204 disposed therein are parallel to the longitudinal axis 416 of the second mounting tab 412.

The sensor bracket 200 further includes a third sensor pocket 430 near the second end 406 of the elongated body 402. The third sensor pocket 430 is configured to receive the third sensor 206 therein. Moreover, the third sensor pocket 430 is oriented so that a longitudinal axis 432 of the third sensor pocket 430 is perpendicular to the longitudinal axis 408 of the elongated body 402. In addition, the third sensor pocket 430 and the third sensor 206 disposed therein are oriented parallel to the longitudinal axis 416 of the second mounting tab 412.

The sensor bracket 200 also includes a curved extension 440 that extends from the first end 404 of the elongated body 402. The curved extension 440 extends in a downward direction, relative to FIGS. 11 and 12, and is generally perpendicular to the longitudinal axis 408 of the elongated body 402. The curved extension 440 includes an inner surface 442 and an outer surface 444. The inner surface 442 is shaped to fit around a gusset on an end of the storage chamber cylinder 150. The outer surface 444 is curved to match the curvature of an outer surface of the storage chamber cylinder 150 adjacent the sensor bracket 200.

Figure 13:
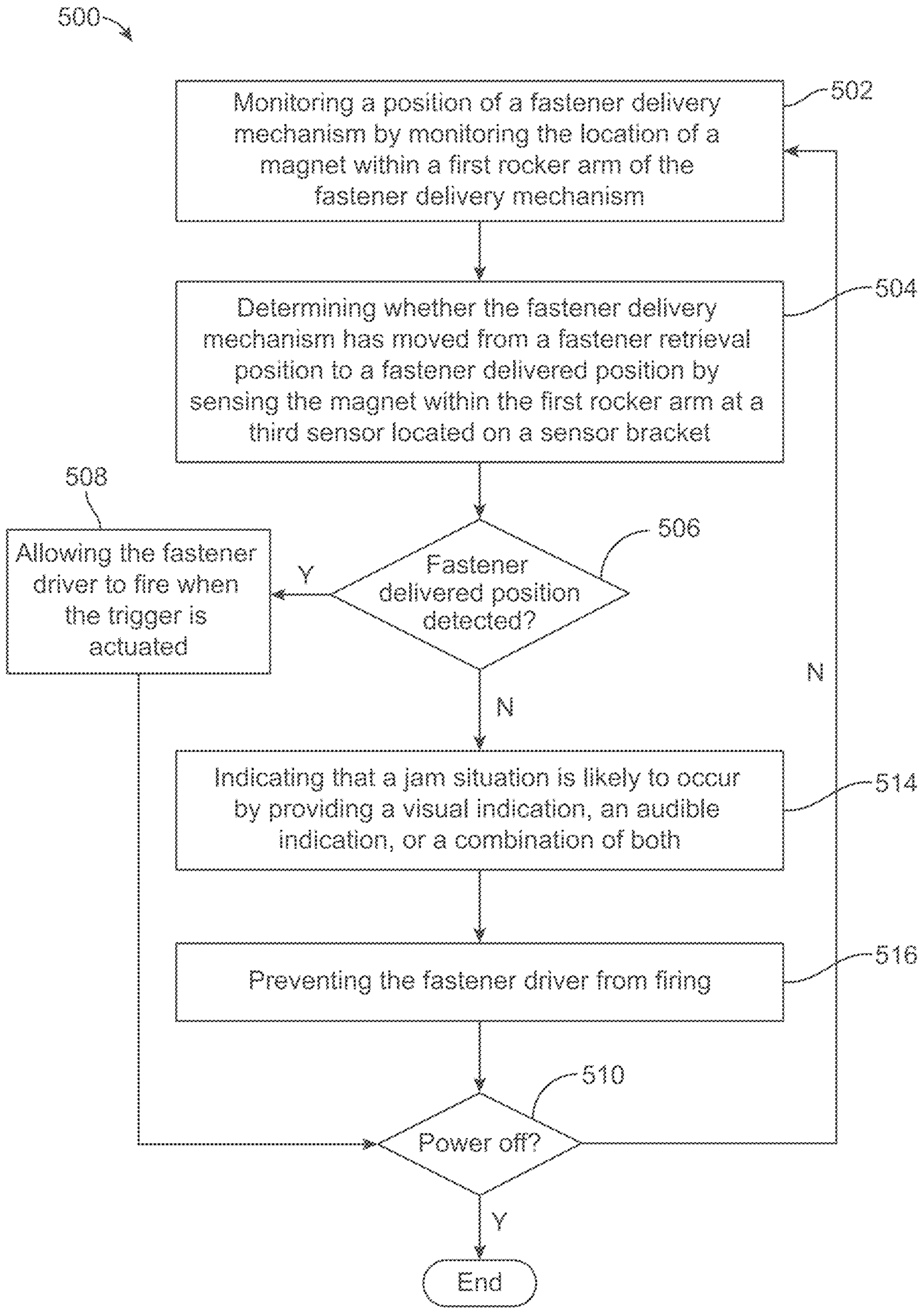
FIG. 13 is a flow chart illustrating a method of operating a gas-spring powered fastener driver.
Figure 14:
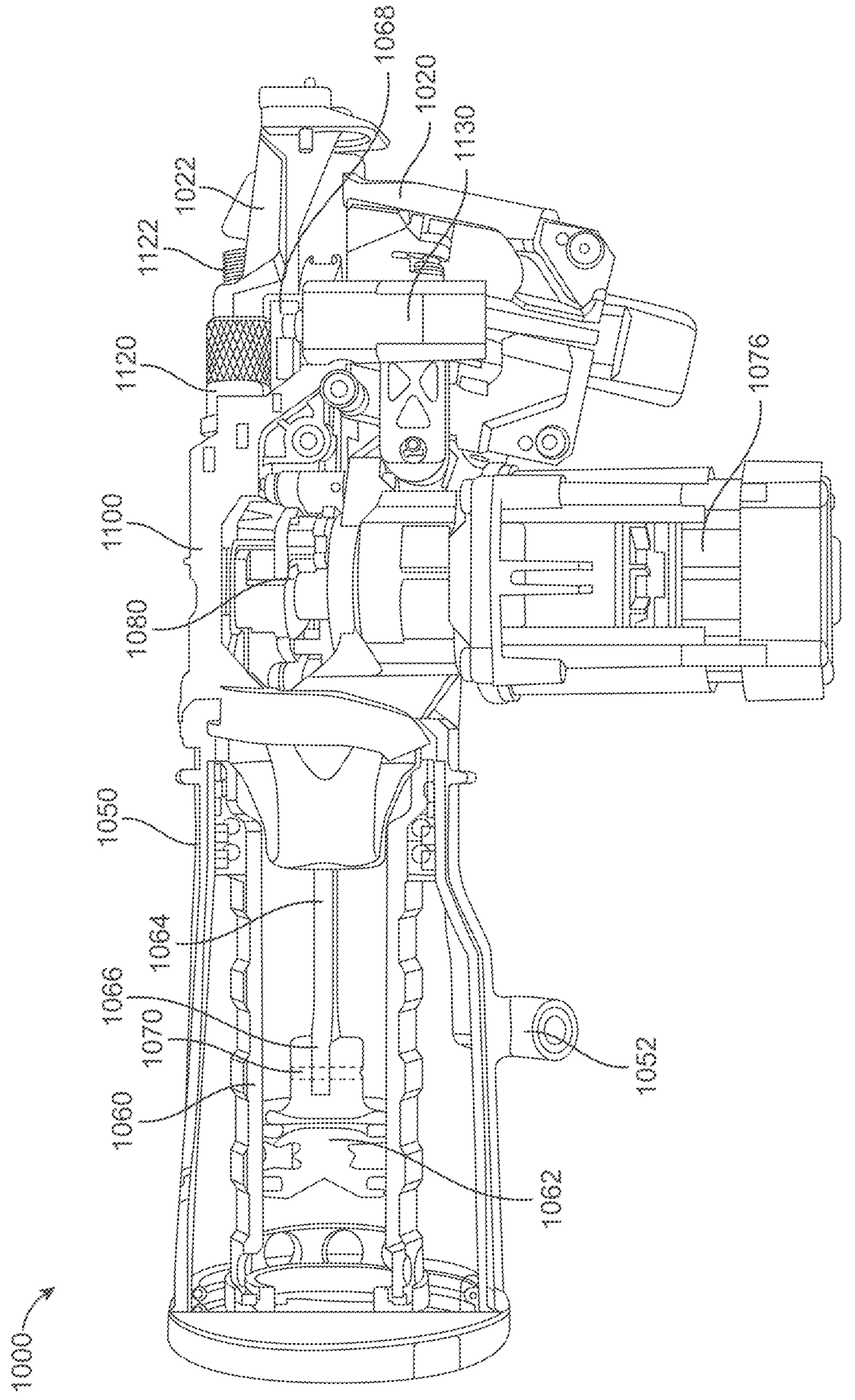
FIG. 14 is a right-side view of another fastener driver with a portion of the housing removed and with a partial cross-section through a storage chamber cylinder.

Referring now to FIG. 13, a method of operating a gas-spring powered fastener driver is illustrated and is generally designated 500. As shown, the method 500 commences at block 502 and includes monitoring a position of a fastener delivery mechanism by monitoring the location of a magnet within a first rocker arm of the fastener delivery mechanism. The method 500 proceeds to block 504 and includes determining whether the fastener delivery mechanism has moved from a fastener retrieval position to a fastener delivered position by sensing the magnet within the first rocker arm at a third sensor located on a sensor bracket. Thereafter, at step 506, the method 500 includes determining whether the fastener delivered position is detected. If the fastener delivered position is detected, the method 500 proceeds to block 508 and includes allowing the fastener driver to fire when the trigger is actuated. The method 500 then proceeds to step 510 and includes determining whether the power is off. If the power is off, the method 500 ends. Otherwise, if the power remains on, the method 500 returns to block 502 and continues as described herein.

Returning to step 506, if the fastener delivered position is not detected, the method 500 moves to block 514 and includes indicating that a jam situation is likely to occur. This may be accomplished by providing a visual indication, an audible indication, or a combination of both. Thereafter, at block 516, the method 500 includes preventing the fastener driver from firing. The method 500 then proceeds to step 510 and includes determining whether the power is off. If the power is off, the method 500 ends. Otherwise, if the power remains on, the method 500 returns to block 502 and continues as described herein.

FIGS. 14-17 illustrate the internal components for another fastener driver 1000. These internal components may be used with the fastener driver 100 in lieu of the internal components illustrated in FIGS. 6-9 (and described in conjunction therewith). As shown, the fastener driver 1000 includes a nosepiece 1020 with a workpiece contact bracket 1022 slidably disposed on the nosepiece 1020. The nosepiece 1020 extends from, or is affixed to, a storage chamber cylinder 1050. With brief reference to FIGS. 1-5, if used in conjunction with the external components of the fastener driver 100 described above, the storage chamber cylinder 1050 would be disposed within the head portion 108 of the housing 102. The storage chamber cylinder 1050 includes a valve port 1052 in which a fill valve is disposed. The fill valve is in fluid communication with the interior of the storage chamber cylinder 1050. For example, the fill valve may be configured as a Schrader valve, a Presta valve, a Dunlop valve, or some other similar valve. When connected with a source of compressed gas, the fill valve enables the storage chamber cylinder 1050 to be filled with compressed gas or refilled with compressed gas if any leakage occurs.

The storage chamber cylinder 1050 includes a driver cylinder 1060 disposed therein. Further, a movable piston 1062 is slidably disposed within the driver cylinder 1060. A driver blade 1064 is connected to the movable piston 1062. As shown, the driver blade 1064 includes a proximal end 1066 and a distal end 1068. The proximal end 1066 of the driver blade 1064 is connected to the movable piston 1062 via a pin 1070. The distal end 1068 of the driver blade 1064 is located adjacent the nosepiece 1020 when the piston 1062 is moved to a top dead center (TDC) (i.e., retracted or ready) position within the driver cylinder 1060 and the fastener driver 100 is ready to be fired. Upon firing, the distal end 1068 of the driver blade 1064 is moved into the nosepiece 1020 to drive a fastener from within the nosepiece 1020 and into a workpiece until the piston 1062 reaches a bottom dead center (BDC) (i.e., extended or driven) position within the driver cylinder 1060.

While not shown in FIGS. 14-17, the fastener driver 1000 may include a circuit board (similar to the circuit board 172) that controls the operation of the fastener driver 1000. The circuit board is electrically connected to a battery receptacle portion and a battery pack when engaged therewith and provides DC power to a motor 1076 (e.g., a brushless direct current (BLDC) motor) that is operably coupled to a lifting mechanism 1080. The lifting mechanism 1080 selectively engages the driver blade 1064 and the lifting mechanism 1080 is driven by the motor 1076 to move the driver blade 1064 from a BDC position to a TDC position and in the process move the piston 1062 from the BDC position to the TDC position. A latch actuator assembly 1090 cooperates with the lifting mechanism 1080 to selectively engage the driver blade 1064 and hold the driver blade 1064 in a ready position before the latch actuator assembly 1090 is actuated by the lifting mechanism 1080 to release the driver blade 1064 into the nosepiece 1020 to drive a fastener from the fastener driver 100 and into a workpiece.

As further depicted in FIGS. 14-17, the fastener driver 1000 further includes a sensor bracket 1100 disposed at least partially above the lifting mechanism 1080. The sensor bracket 1100 includes a first sensor 1102 configured to sense an angular (or rotational) position of the lifting mechanism 1080, a second sensor 1104 to sense a linear position of the workpiece contact bracket 1022 that is slidably disposed on the nosepiece 1020, and a third sensor 1106 to sense the position of a fastener delivery mechanism 1130, or one or more links within the fastener delivery mechanism 1130, described below. For example, the first sensor 1102 is a Hall-effect sensor that is configured to sense a nearby magnet or the presence of a magnetic field nearby. The second and third sensors 1104, 1106 are inductive sensors that are configured to output a signal based on the movement of one or more metal targets installed on the fastener driver 1000 to move in the vicinity of the sensors 1104, 1106.

As shown, the lifting mechanism 1080 includes a magnet 1110 that is sensed by the first sensor 1102 to determine the angular (or rotational), of the lifting mechanism 1080 as the lifting mechanism 1080, or a portion thereof, rotates to move the driver blade 1064 from the BDC position to the TDC position. The workpiece contact bracket 1022 includes a workpiece contact bracket (WCB) target 1112 that is a metal target, e.g., a ferrous target. Further, the WCB target 1112 is a steel target, e.g., a carbon steel target. The WCB target 1112 is sensed by the second sensor 1104 to determine a position of the workpiece contact bracket 1022 as it slides on the nosepiece 1020 between an extended position in which the fastener driver 100 is prevented from firing and a retracted, or depressed, position in which the fastener driver 100 is engaged with a workpiece and the fastener driver 100 is permitted to fire and drive a fastener into a workpiece.

FIGS. 14-17 further indicate that the fastener driver 100 includes a depth adjuster 1120 having a threaded shaft 1122 that is threadably engaged with the workpiece contact bracket 1022. The depth adjuster 1120 is rotatable to change a linear position of the workpiece contact bracket 1022 relative to the nosepiece 1020. This changes the depth to which a fastener expelled from the fastener driver 100 is driven into a workpiece.

Figure 16:
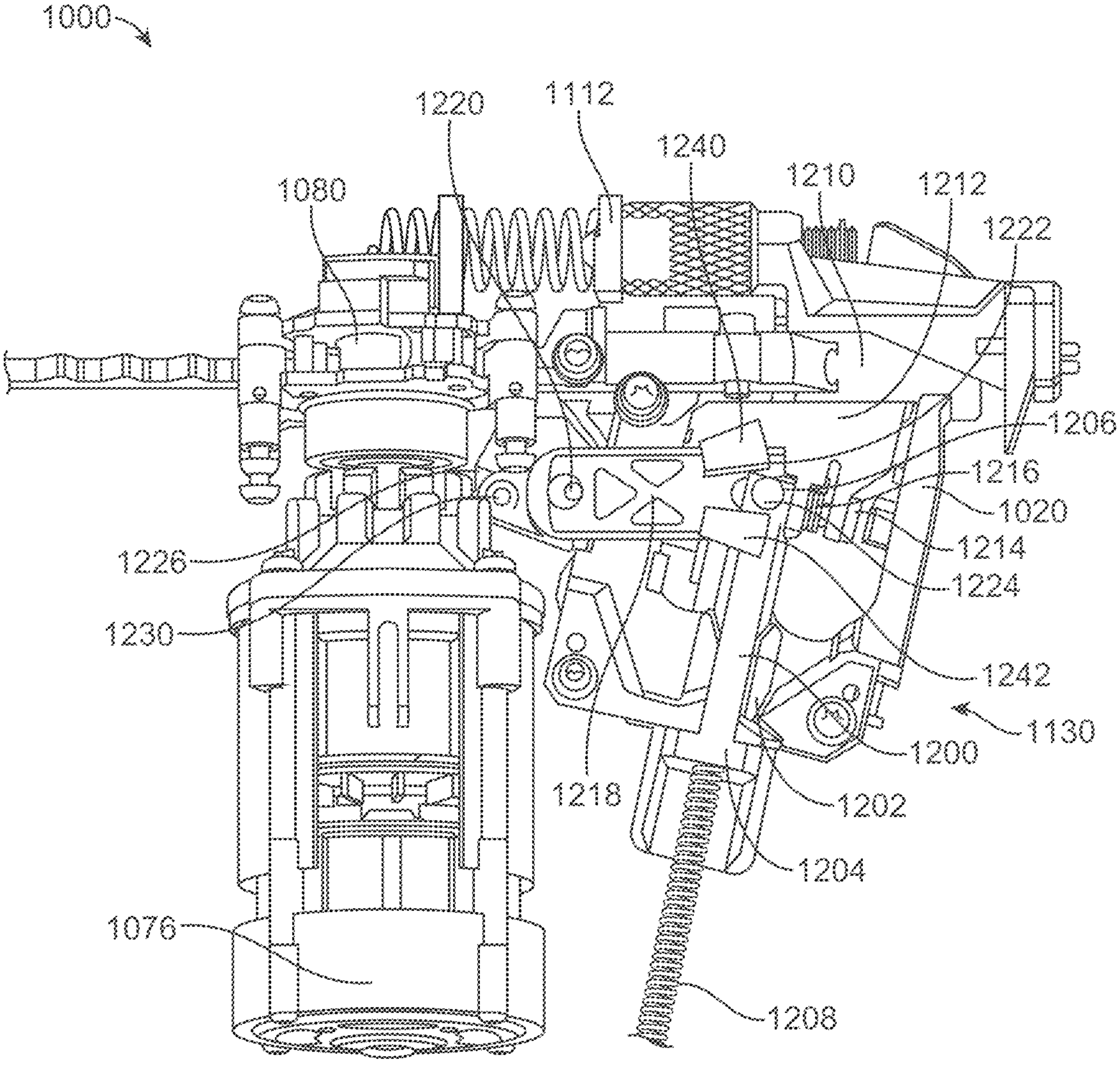
FIG. 16 is a left-side view of the fastener driver of FIG. 14 with the housing and other parts removed.
Figure 17:
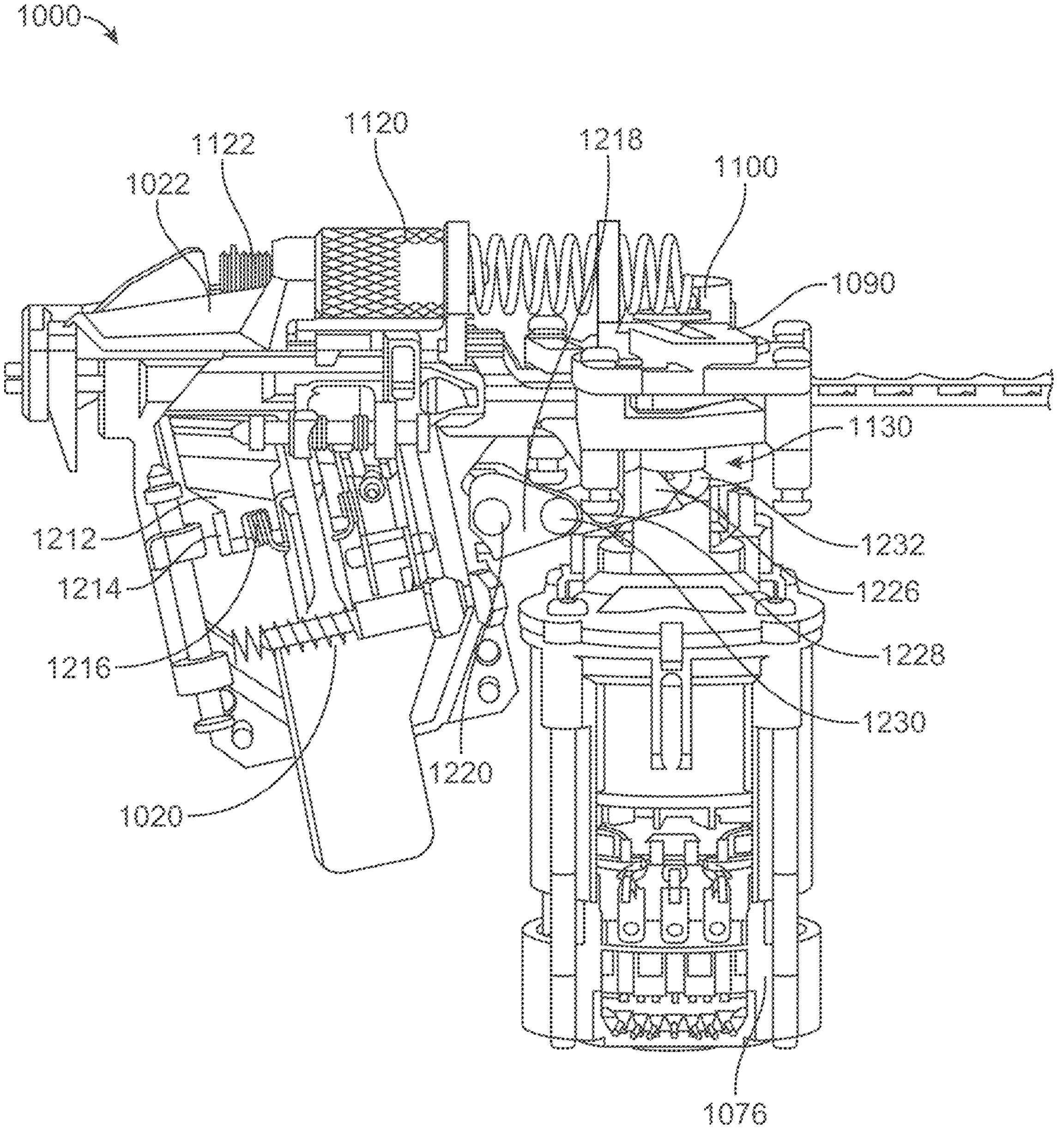
FIG. 17 is a right-side view of the fastener driver of FIG. 14 with the housing and other parts removed.

As best illustrated in FIGS. 16 and 17, the fastener driver 100 also includes a fastener delivery mechanism 1130. The fastener delivery mechanism 1130 includes a spring-loaded actuator portion 1200 that is slidably disposed within a bracket 1202 on the nosepiece 1020. The actuator portion 1200 includes a proximal end 1204 and a distal end 1206. A spring 1208 is installed in compression adjacent the proximal end 1204 of the actuator portion 1200 to bias the actuator portion 1200 toward a driving channel 1210 of the nosepiece 1020. An advancer 1212 is mounted on the distal end 1206 of the actuator portion 1200 via a hinge pin 1214. A torsional spring 1216 is disposed on the hinge pin 1214 to bias the advancer 1212 around the hinge pin 1214 toward the nosepiece 1020.

The fastener delivery mechanism 1130 further includes a first rocker arm 1218 rotatably mounted on the nosepiece 1020 via a first post 1220 (e.g., a threaded fastener). The first rocker arm 1218 includes a forked end 1222 that fits around a lateral post 1224 on the distal end 1206 of the actuator portion 1200. As shown, the fastener delivery mechanism 1130 also includes a second rocker arm 1226 rotatably mounted on the nosepiece 1020 via a second post 1228 and mounted to the first rocker arm 1218 via a third post 1230. A spring-loaded actuator 1232 is installed on a free end of the second rocker arm 1226. The spring-loaded actuator 1232 may only rotate in a single direction toward the delivery end of the fastener driver 1000 against the force of a spring which returns it to an upright position. As the driver blade 1064 is returned to the TDC position, a tooth on the driver blade 1064 engages the spring-loaded actuator 1232 to actuate the fastener delivery mechanism 1130 and move a fastener into the driving channel 1210 of the nosepiece 1020 to be fired when the trigger is pulled.

FIG. 16 indicates that the fastener delivery mechanism 1130 of the fastener driver 1000 includes a first actuator target 1240 on the forked end 1222 of the first rocker arm 1218 above the lateral post 1224 on the distal end 1206 of the actuator portion 1200. Moreover, the fastener delivery mechanism 1130 of the fastener driver 1000 includes a second actuator target 1242 on the forked end 1222 of the first rocker arm 1218 below the lateral post 1224 on the distal end 1206 of the actuator portion 1200 opposite the first actuator target 1240. In a particular aspect, the actuator targets 1240, 1242 are metal targets, e.g., ferrous targets. Further, the actuator targets 1240, 1242 are steel targets, e.g., carbon steel targets. In one embodiment, the actuator targets 1240, 1242 are the same size and shape. In another embodiment, the actuator targets 1240, 1242 are different sizes and different shapes. For example, the first actuator target 1240 may be larger than the second actuator target 1242. Further, the first actuator target 1240 may be smaller than the second actuator target 1242. In another embodiment, the actuator targets 1240, 1242 may have the same mass. In still another embodiment, the actuator targets 1240, 1242 may have different masses. For example, the mass of the first actuator target 1240 may be greater than the mass of the actuator target 1242. Alternatively, the mass of the first actuator target 1240 may be less than The actuator targets 1240, 1242 are sensed by the second sensor 1104 to determine a position of the first rocker arm 1218 and a position of the fastener delivery mechanism 1130 as it delivers fasteners one-at-a-time to the driving channel 1210 of the nosepiece 1020. For example, as the first rocker arm 1218 rotates clockwise and moves the advancer 1212 in a first direction, e.g., in a downward direction away from the nosepiece 1020, along a band of collated fasteners, the fastener delivery mechanism 1130 moves to a fastener retrieval position. In the fastener retrieval position, the magnet 1114 is moved away from the third sensor 1106 and is no longer detected by the third sensor 1106. When the first rocker arm 1218 rotates clockwise and the advancer 1212 moves in a second direction, e.g., in an upward direction toward the nosepiece 1020, as the actuator portion 1200 is fully extended, the advancer 1212 moves a retrieved fastener into the driving channel 1210 of the nosepiece 1020 and the fastener delivery mechanism 1130 moves to a fastener delivered position. In the fastener delivered position, the magnet 1114 is detected by the third sensor 1106 and the fastener driver 100 is allowed to fire. Specifically, the circuit board, i.e., the electronic control unit, of the fastener driver 100 receives an input from the third sensor 1106, when the presence of magnet 1114 is detected, that indicates that a fastener is properly loaded into the fastener driving channel 1210. Thereafter, the circuit board activates the motor 1076 in response to the workpiece contact bracket 1022 being retracted, or depressed onto a workpiece, and the trigger being pulled.

If the magnet 1114 is not detected by the third sensor 1106, the fastener in the advancer 1212 is not fully delivered and a jam is likely to occur if the fastener driver 100 is allowed to fire. As such, if the magnet 1114 on the first rocker arm 1218 is not detected, the fastener driver 100 is not allowed to fire. Specifically, the circuit board, i.e., the electronic control unit, of the fastener driver 100 receives an input from the third sensor 1106, when the presence of the magnet 1114 is not detected, that indicates that a fastener is not properly loaded into the fastener driving channel 1210. As such, the circuit board will not activate the motor 1076 if the workpiece contact bracket 1022 is retracted and the trigger is pulled.

Figure 15:
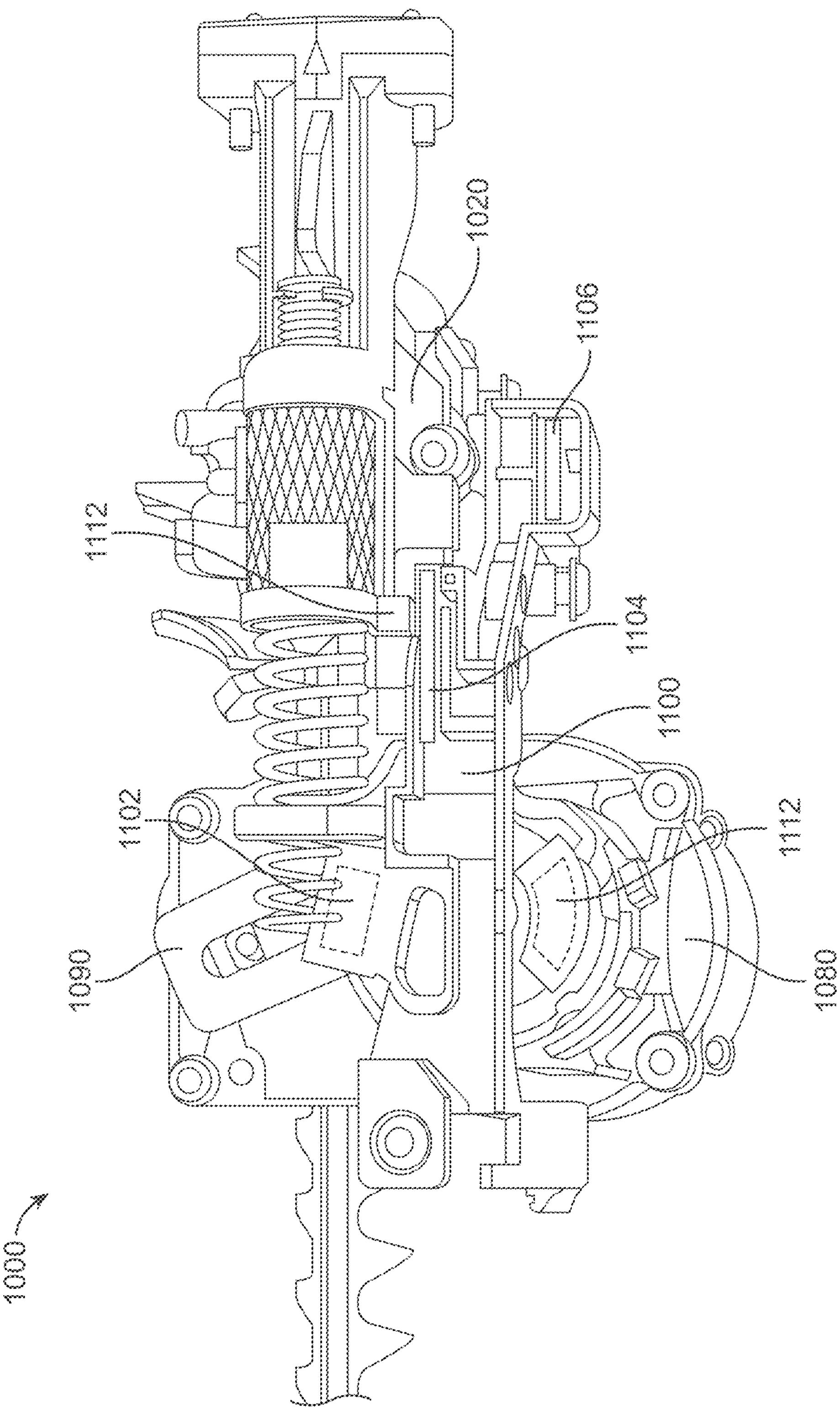
FIG. 15 is a top view of the fastener driver of FIG. 14 with the housing and other parts removed.
Figure 18:
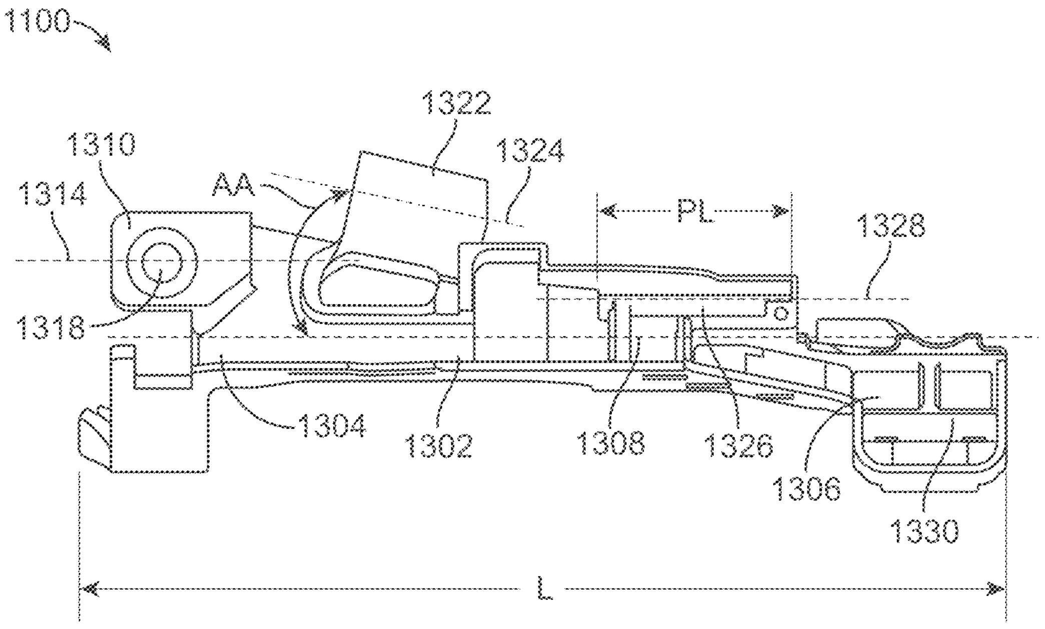
FIG. 18 is a top view of a sensor bracket for the fastener driver of FIG. 14.
Figure 19:
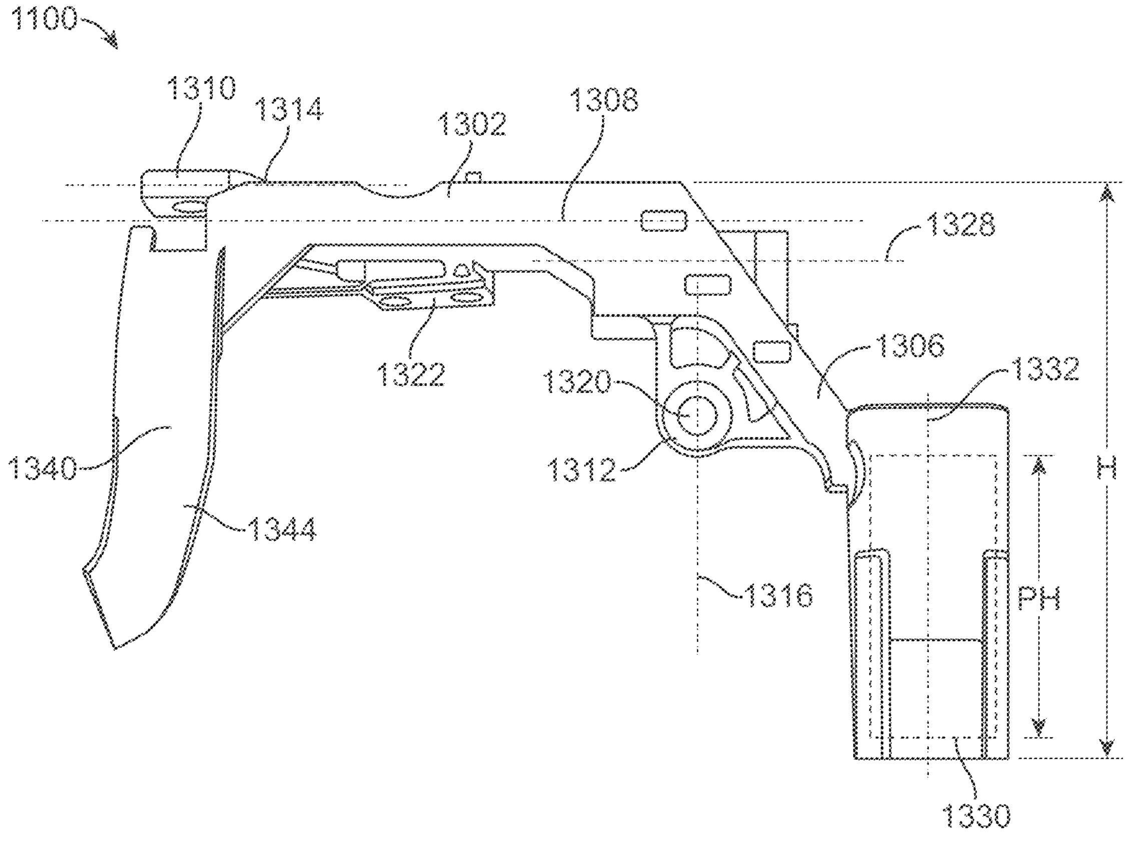
FIG. 19 is a right-side view of the sensor bracket of FIG. 18.
Figure 20:
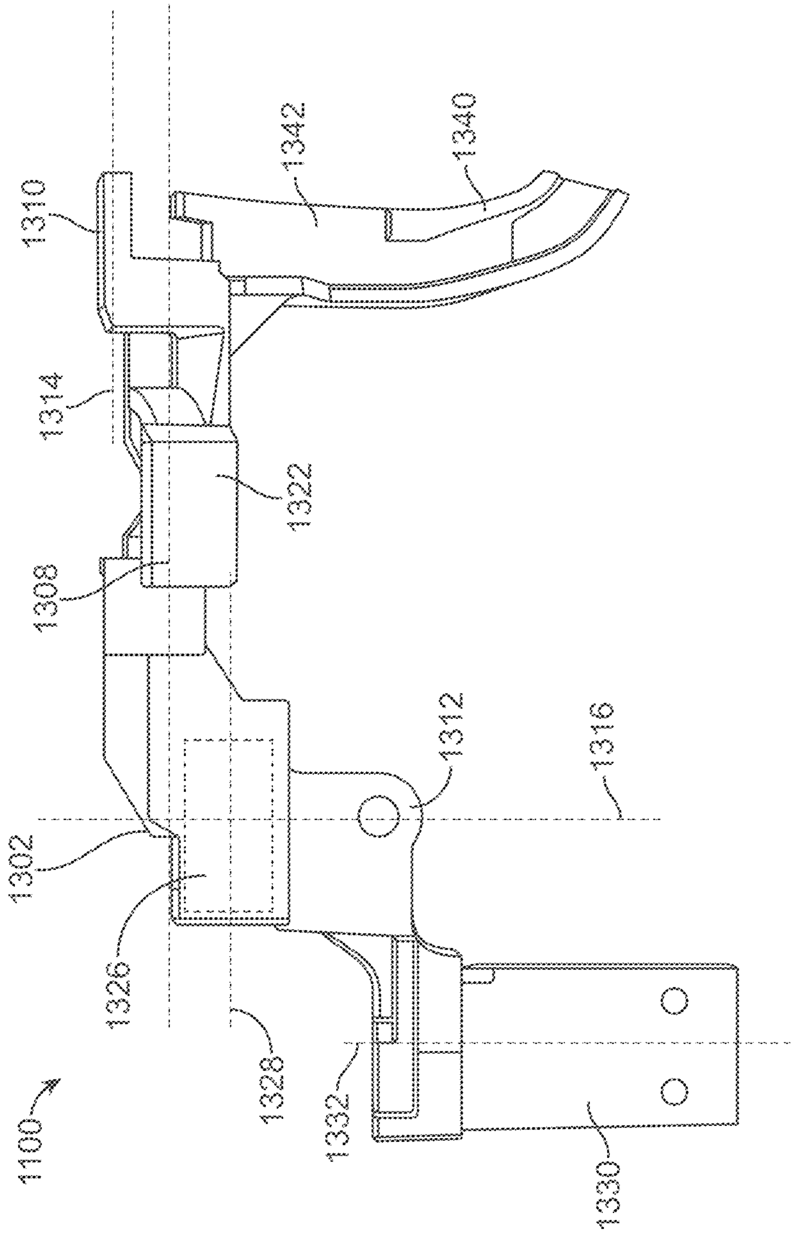
FIG. 20 is a left-side view of the sensor bracket of FIG. 18.

Referring to FIGS. 18-20, the details of the sensor bracket 1100 are shown. As previously indicated, the sensor bracket 1100 is configured to hold the first sensor 1102, the second sensor 1104, and the third sensor 1106 as shown in FIG. 15. As illustrated in FIGS. 18-20, the sensor bracket 1100 includes an elongated body 1302 having a first end 1304 and a second end 1306. The elongated body 1302 of the sensor bracket 1100 defines a longitudinal axis 1308. A first mounting tab 1310 extends from the elongated body 1302 near the first end 1304. A second mounting tab 1312 extends from the elongated body 1302 near the midpoint of the elongated body 1302 between the midpoint and the second end 1306. As shown, the first mounting tab 1310 defines a longitudinal axis 1314 that is parallel to the longitudinal axis 1308 of the elongated body 1302 of the sensor bracket 1100. The second mounting tab 1312 defines a longitudinal axis 1316 that is perpendicular to the longitudinal axis 1308 of the elongated body 1302. As shown, the mounting tabs 1310, 1312 are formed with holes 1318, 1320 to allow fasteners to extend therethrough to mount the sensor bracket 1100 within the housing 102 of the fastener driver 100.

FIGS. 18-20 further show that the sensor bracket 1100 includes a first sensor pocket 1322 formed near a midpoint of the elongated body 1302 between the midpoint and the first end 1304. The first sensor pocket 1322 is configured to receive the first sensor 1102 therein. Further, the first sensor pocket 1322 is oriented so that a longitudinal axis 1324 of the first sensor pocket 1322 is at an acute angle AA with respect to the longitudinal axis 1308 of the elongated body 1302. Also, the first sensor pocket 1322 and the first sensor 1102 disposed therein are parallel to the first mounting tab 1310. In a particular aspect, the acute angle AA is greater than or equal to 5.0°, such as greater than or equal to 6.0°, greater than or equal to 7.0°, greater than or equal to 8.0°, greater than or equal to 9.0°, greater than or equal to 10.0°, greater than or equal to 11.0°, or greater than or equal to 12.0°. Further, the angle AA is less than or equal to 110.0°, such as less than or equal to 109.0°, less than or equal to 108.0°, less than or equal to 107.0°, less than or equal to 106.0°, less than or equal to 105.0°, less than or equal to 14.0°, or less than or equal to 13.0°. It is to be understood that the angle AA may be within a range between, and including, any of the maximum and minimum values of AA disclosed herein.

The sensor bracket 1100 also includes a second sensor pocket 1326 near the midpoint of the elongated body 1302 between the midpoint and the second end 1306 and near the second mounting tab 1312. As shown, the second sensor pocket 1326 is configured to receive the second sensor 1104 therein. Further, the second sensor pocket 1326 is oriented so that a longitudinal axis 1328 of the second sensor pocket 1326 is parallel to the longitudinal axis 1308 of the elongated body 1302. In addition, the second sensor pocket 1326 and the second sensor 1104 disposed therein are perpendicular to the longitudinal axis 1316 of the second mounting tab 1312.

As shown in FIG. 18, the second sensor pocket 1326 has a pocket length PL that extends at least partially along the overall length L of the sensor bracket 1100. In one aspect, the pocket length PL is less than or equal to forty percent (40%) of the overall length L, such as less than or equal to thirty-five percent (35%) of the overall length L, less than or equal to forty percent (30%) of the overall length L, or less than or equal to twenty-five percent (25%) of the overall length L. Further, the pocket length PL is greater than or equal to five percent (5%) of the overall length L, such as greater than or equal to ten percent (10%) of the overall length, greater than or equal to fifteen percent (15%) of the overall length, or greater than or equal to twenty percent (20%) of the overall length. In another aspect, the pocket length PL is within a range between, and including, any of the maximum and minimum values of the pocket length PL disclosed herein.

The sensor bracket 1100 further includes a third sensor pocket 1330 near the second end 1306 of the elongated body 1302. The third sensor pocket 1330 is configured to receive the third sensor 1106 therein. Moreover, the third sensor pocket 1330 is oriented so that a longitudinal axis 1332 of the third sensor pocket 1330 is perpendicular to the longitudinal axis 1308 of the elongated body 1302 and the longitudinal axis 1328 of the second sensor pocket 1326. In addition, the third sensor pocket 1330 and the third sensor 1106 disposed therein are oriented parallel to the longitudinal axis 1316 of the second mounting tab 1312.

As shown in FIG. 19, the third sensor pocket 1330 has a pocket height PH that extends at least partially along the overall height H of the sensor bracket 1100. In one aspect, the pocket height PH is less than or equal to seventy percent (70%) of the overall height H, such as less than or equal to sixty-five percent (65%) of the overall height H, less than or equal to sixty percent (60%) of the overall height H, or less than or equal to fifty-five percent (55%) of the overall height H. Further, the pocket height PH is greater than or equal to thirty-five percent (35%) of the overall height H, such as greater than or equal to forty percent (40%) of the overall height, greater than or equal to forty-five percent (45%) of the overall height, or greater than or equal to fifty percent (50%) of the overall height. In another aspect, the pocket height PH is within a range between, and including, any of the maximum and minimum values of the pocket height PH disclosed herein.

The sensor bracket 1100 also includes a curved extension 1340 that extends from the first end 1304 of the elongated body 1302. The curved extension 1340 extends in a downward direction, relative to FIGS. 11 and 12, and is generally perpendicular to the longitudinal axis 1308 of the elongated body 1302. The curved extension 1340 includes an inner surface 1342 and an outer surface 1344. The inner surface 1342 is shaped to fit around a gusset on an end of the storage chamber cylinder 1050. The outer surface 1344 is curved to match the curvature of an outer surface of the storage chamber cylinder 1050 adjacent the sensor bracket 1100.

Figure 21:
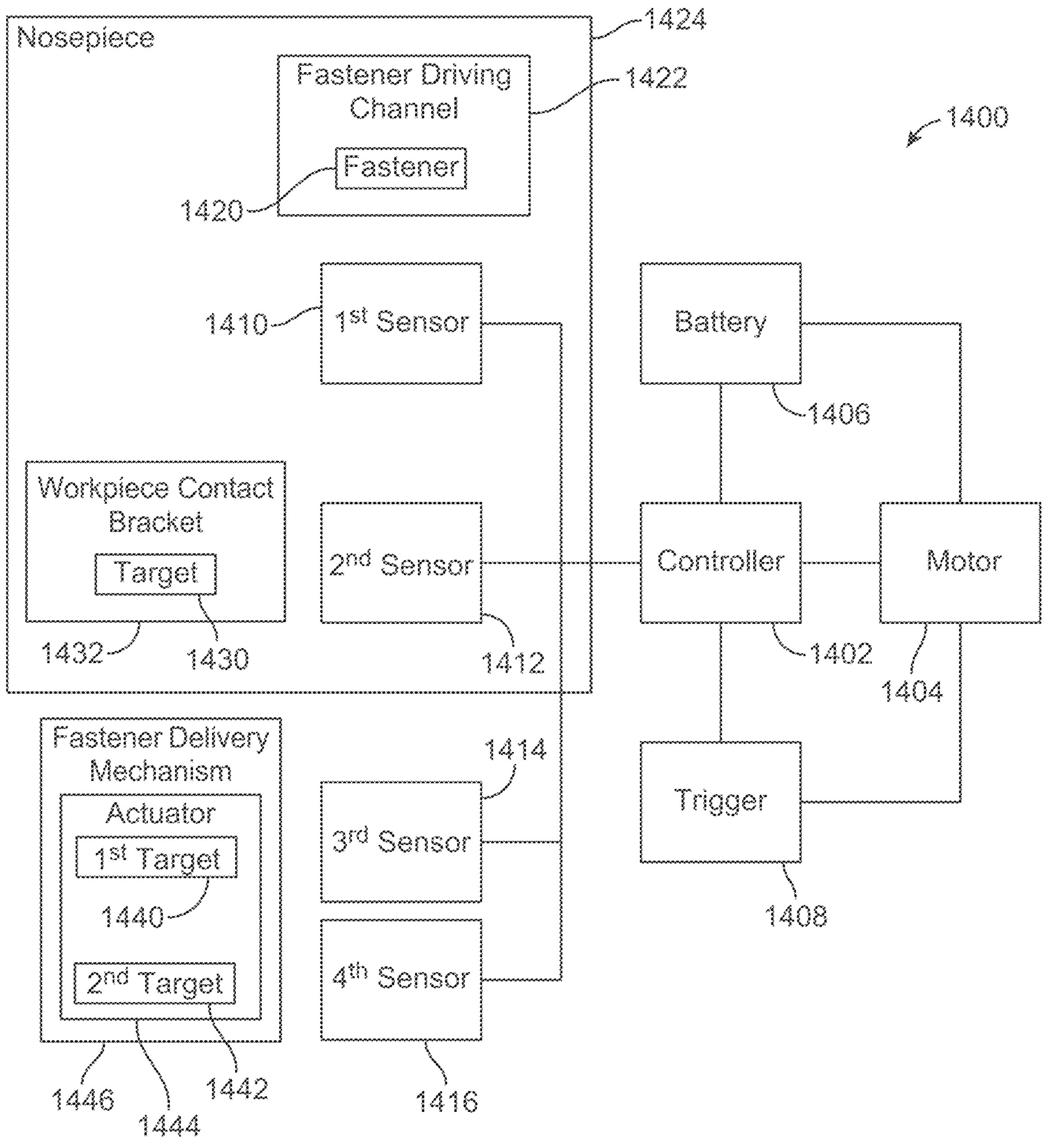
FIG. 21 is a block diagram of a gas-spring powered fastener driver.

FIG. 21 is a block diagram illustrating a gas-spring powered fastener driver 1400. As shown, the gas-spring powered fastener driver 1400 includes a controller 1402, i.e., an electronic control unit. A motor 1404 and a battery 1406 are operably coupled to the controller 1402. Further, a trigger 1408 is operably coupled to the controller 1402 and the motor 1404. A first sensor 1410, a second sensor 1412, a third sensor 1414, and a fourth sensor 1416 are operably coupled to the controller 1402. The controller 1402 uses signals from the sensors 1410, 1412, 1414, 1416 to control the operation of the motor 1404 and the gas-spring fastener driver 1400. The sensors 1410, 1412, 1414, 1416 include hall sensors, inductive sensors, microswitches, optical sensors, acoustic sensors, or any combination thereof.

As shown, the first sensor 1410 is positioned within the gas-spring powered fastener driver 1400 to sense a fastener 1420, e.g., a nail, within a fastener driving channel 1422 of a nosepiece 1424 of the gas-spring powered fastener driver 1400. For example, the first sensor 1410 may be placed adjacent the fastener driving channel 1422. Alternatively, the first sensor 1410 may be partially or completely disposed within the fastener driving channel 1422, e.g., in a sidewall thereof. If a fastener 1420 is sensed within the fastener driving channel 1422 by the first sensor 1410, the controller 1402 sends a signal to the trigger 1408 to allow the motor 1404 to be actuated. If a fastener 1420 is not sensed within the fastener driving channel 1422, the controller 1402 prevents the motor 1404 from being actuated when the trigger 1408 is depressed, or otherwise toggled.

The second sensor 1412 is positioned to sense a workpiece contact bracket (WCB) target 1430, e.g., a ferrous target, on the workpiece contact bracket 1432 slidably disposed on the nosepiece 1424. When the WCB target 1430 is sensed, indicating that the workpiece contact bracket 1432 is engaged with a workpiece, the controller 1402 sends a signal to the trigger 1408 to allow the motor 1404 to be actuated to drive a fastener into the workpiece. If the WCB target 1430 is not detected, the controller 1402 prevents the motor 1404 from being actuated when the trigger 1408 is depressed, or otherwise toggled.

FIG. 21 further shows that the third sensor 1414 and the fourth sensor 1416 are positioned to detect a first actuator target 1440 and a second actuator target 1442 on an actuator 1444 within a fastener delivery mechanism 1446 to determine a position of the actuator 1444 and the fastener delivery mechanism 1446 while the fastener delivery mechanism 1446 is moving, or attempting to move, the fastener 1420 into the fastener driving channel 1422 of the nosepiece 1424. The position of the fastener delivery mechanism 1446 can indicate whether the fastener 1420 is properly delivered or a jam has occurred. If the position of the fastener delivery mechanism 1446 indicates that the fastener 1420 is properly delivered, the controller 1402 sends a signal to the trigger 1408 to allow the motor 1404 to be actuated to drive a fastener into the workpiece. If the position of the fastener delivery mechanism 1446 indicates that jam has occurred, the controller 1402 prevents the motor 1404 from being actuated when the trigger 1408 is depressed, or otherwise toggled. It is to be understood that other parts of the fastener delivery mechanism 1446 may include targets that may be detected by the third and fourth sensors 1414, 1416 to determine the position of the fastener delivery mechanism 1446.

Figure 22:
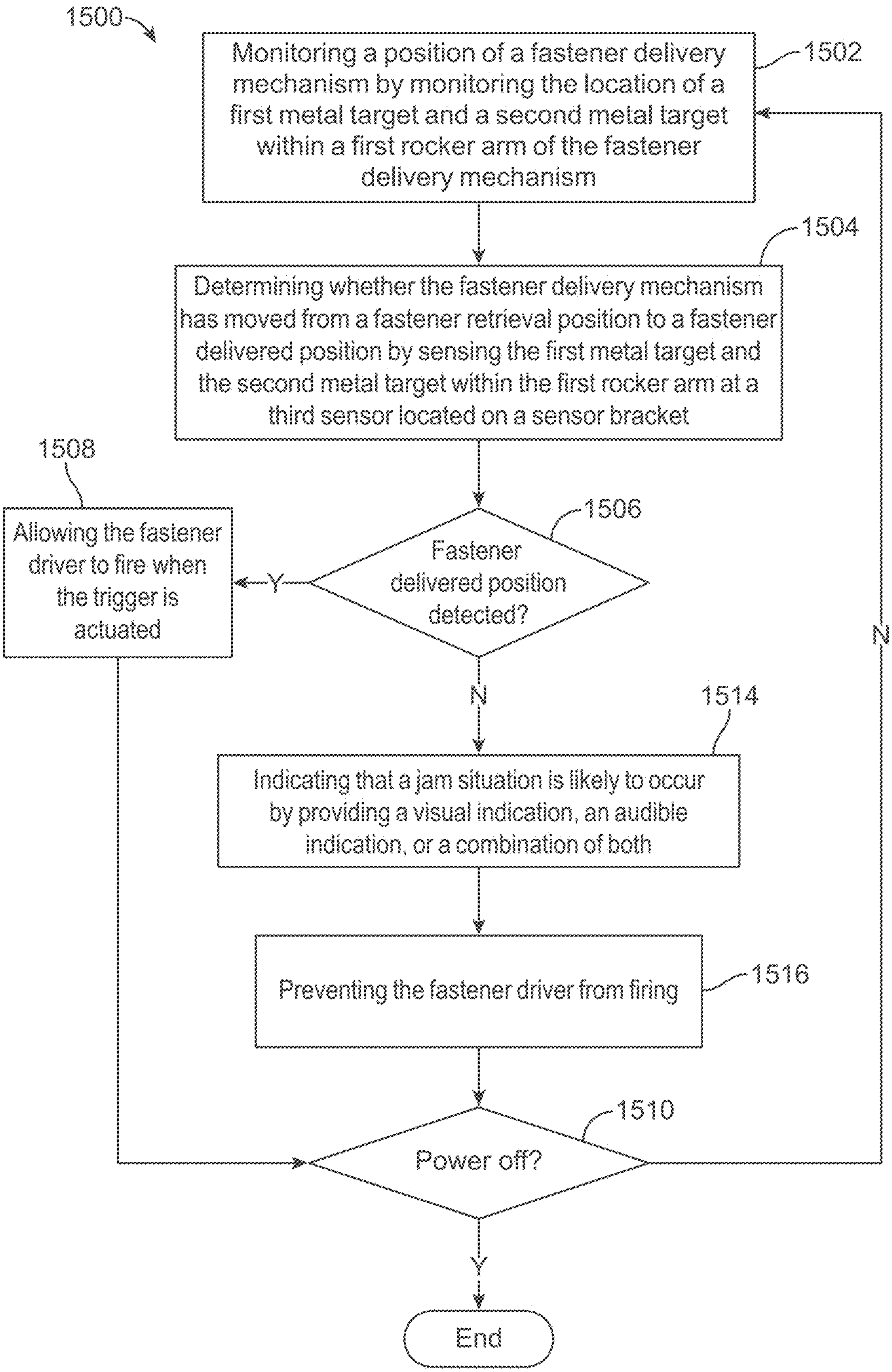
FIG. 22 is a flow chart illustrating another method of operating a gas-spring powered fastener driver.

Referring now to FIG. 22, a method of operating a gas-spring powered fastener driver is illustrated and is generally designated 1500. As shown, the method 1500 commences at block 1502 and includes monitoring a position of a fastener delivery mechanism by monitoring the location of a first metal target and a second metal target disposed on, or molded into, a first rocker arm of the fastener delivery mechanism. The method 1500 proceeds to block 1504 and includes determining whether the fastener delivery mechanism has moved from a fastener retrieval position to a fastener delivered position by sensing the first and second metal targets within the first rocker arm at a third sensor located on a sensor bracket. Thereafter, at step 1506, the method 1500 includes determining whether the fastener delivered position is detected. If the fastener delivered position is detected, the method 1500 proceeds to block 1508 and includes allowing the fastener driver to fire when the trigger is actuated. The method 1500 then proceeds to step 1510 and includes determining whether the power is off. If the power is off, the method 1500 ends. Otherwise, if the power remains on, the method 1500 returns to block 1502 and continues as described herein.

Returning to step 1506, if the fastener delivered position is not detected, the method 1500 moves to block 1514 and includes indicating that a jam situation is likely to occur, or has occurred. This may be accomplished by providing a visual indication, an audible indication, haptic feedback, or a combination thereof. Thereafter, at block 1516, the method 1500 includes preventing the fastener driver from firing. The method 1500 then proceeds to step 1510 and includes determining whether the power is off. If the power is off, the method 1500 ends. Otherwise, if the power remains on, the method 1500 returns to block 1502 and continues as described herein.

Figure 23:
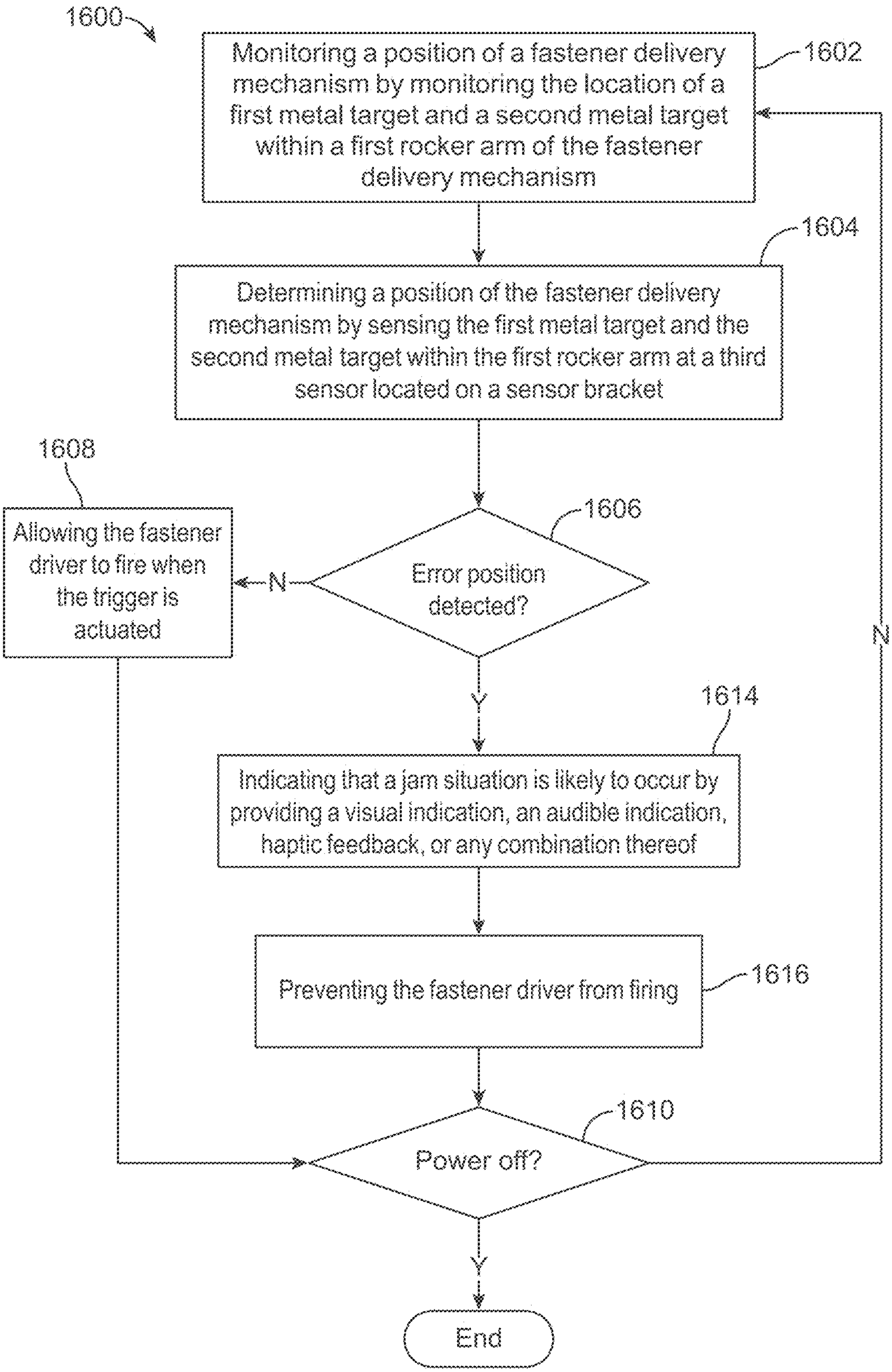
FIG. 23 is a flow chart illustrating yet another method of operating a gas-spring powered fastener driver.

FIG. 23 depicts another method of operating a gas-spring powered fastener driver is illustrated. The method is generally designated 1600. As shown, the method 1600 commences at block 1602 and includes monitoring a position of a fastener delivery mechanism by monitoring the location of a first metal target and a second metal target disposed on, or molded into, a first rocker arm of the fastener delivery mechanism. The method 1600 proceeds to block 1604 and includes determining a position of the fastener delivery mechanism by sensing the first and second metal targets within the first rocker arm at a third sensor located on a sensor bracket. Thereafter, at step 1606, the method 1600 includes determining whether an error position is detected. For example, an error position can include a position in which the fastener delivery mechanism has not properly return to a position in which a nail is (or should have been) loaded to a fastener driving channel of a nosepiece of the powered fastener driver. If an error position is not detected, the method 1600 proceeds to block 1608 and includes allowing the fastener driver to fire when the trigger is actuated. The method 1600 then proceeds to step 1610 and includes determining whether the power is off. If the power is off, the method 1600 ends. Otherwise, if the power remains on, the method 1600 returns to block 1602 and continues as described herein.

Returning to step 1606, if an error position is detected, the method 1600 moves to block 1614 and includes indicating that a jam situation is likely to occur or has occurred. This may be accomplished by providing a visual indication, an audible indication, haptic feedback, or a combination thereof. Thereafter, at block 1616, the method 1600 includes preventing the fastener driver from firing. The method 1600 then proceeds to step 1610 and includes determining whether the power is off. If the power is off, the method 1600 ends. Otherwise, if the power remains on, the method 1600 returns to block 1602 and continues as described herein.

Figure 24:
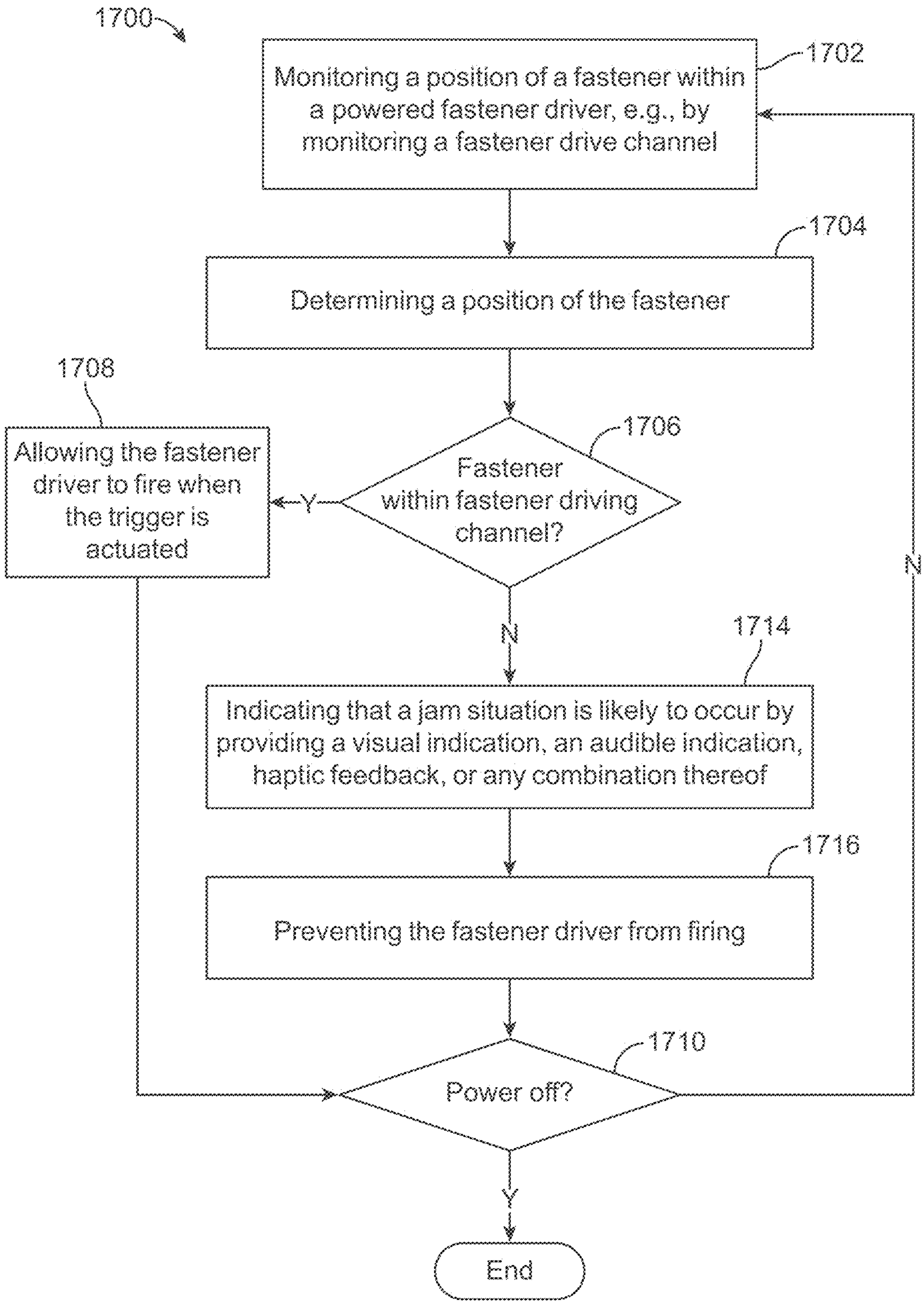
FIG. 24 is a flow chart illustrating still another method of operating a gas-spring powered fastener driver.

FIG. 24 illustrates yet another method of operating a gas-spring powered fastener driver is illustrated. The method is generally designated 1700. As shown, the method 1700 commences at block 1702 and includes monitoring a position of a fastener within a powered fastener driver, e.g., by monitoring a fastener driving channel. The method 1700 proceeds to block 1704 and includes determining a position of the fastener by sensing/not sensing the fastener using a sensor placed adjacent the fastener driving channel. Thereafter, at step 1706, the method 1700 includes determining whether a fastener is detected within the fastener driving channel. If a fastener is detected within the fastener driving channel, the method 1700 proceeds to block 1708 and includes allowing the fastener driver to fire when the trigger is actuated. The method 1700 then proceeds to step 1710 and includes determining whether the power is off. If the power is off, the method 1700 ends. Otherwise, if the power remains on, the method 1700 returns to block 1702 and continues as described herein.

Returning to step 1706, if a fastener is not detected within the fastener driving channel, the method 1700 moves to block 1714 and includes indicating that a jam situation is likely to occur, or has occurred. This may be accomplished by providing a visual indication, an audible indication, haptic feedback, or a combination thereof. Thereafter, at block 1716, the method 1700 includes preventing the fastener driver from firing. The method 1700 then proceeds to step 1710 and includes determining whether the power is off. If the power is off, the method 1700 ends. Otherwise, if the power remains on, the method 1700 returns to block 1702 and continues as described herein.

Although the disclosure has been described in detail with reference to certain preferred embodiments, variations and modifications exist within the scope and spirit of one or more independent aspects of the disclosure as described.

Various features of the invention are set forth in the following claims.

What is claimed is:

1. A powered fastener driver comprising:

a housing;

a nosepiece extending from the housing;

a driver blade movable within the nosepiece;

a piston coupled to the driver blade for movement therewith;

a driver cylinder within which the piston is movable from a top dead center position (TDC) and a bottom dead center (BDC) position;

a magazine coupled to the nosepiece in which collated fasteners are receivable;

a fastener delivery mechanism coupled to the nosepiece for individually transferring collated fasteners in the magazine to a fastener driving channel in the nosepiece, the fastener delivery mechanism movable between a fastener retrieval position and a fastener delivered position in which a fastener of the collated fasteners is properly loaded into the fastener driving channel; and a sensor for determining when the fastener delivery mechanism is in the fastener delivered position, wherein the fastener delivery mechanism includes a first rocker arm, and wherein the sensor monitors a location of the first rocker arm to determine when the fastener delivery mechanism is in the fastener delivered position.

2. The powered fastener driver of claim 1, wherein the powered fastener driver is allowed to fire and drive a fastener into a workpiece when the fastener delivery mechanism is in the fastener delivered position.

3. The powered fastener driver of claim 1, wherein the powered fastener driver is prevented from firing when the fastener delivery mechanism is in an error position.

4. The powered fastener driver of claim 1, wherein the powered fastener driver is not allowed to fire and drive a fastener into a workpiece when the fastener delivery mechanism is not in the fastener delivered position.

5. The powered fastener driver of claim 1, wherein the fastener delivery mechanism includes an actuator portion coupled to an advancer, and wherein the actuator portion moves the advancer in a first direction to retrieve a fastener when the fastener delivery mechanism is in the fastener retrieval position.

6. The powered fastener driver of claim 5, wherein the actuator portion moves the advancer in a second direction to move a fastener into the fastener driving channel when the fastener delivery mechanism is in the fastener delivered position.

7. The powered fastener driver of claim 1, wherein the fastener delivery mechanism includes at least one magnet and the at least one magnet is sensed by the sensor to determine when the fastener delivery mechanism is in the fastener delivered position.

8. The powered fastener driver of claim 7, wherein the sensor is a Hall-effect sensor.

9. The powered fastener driver of claim 1, wherein the fastener delivery mechanism includes at least one metal target and the at least one metal target is sensed by the sensor to determine when the fastener delivery mechanism is in the fastener delivered position.

10. The powered fastener driver of claim 9, wherein the sensor is an inductive sensor.

11. The powered fastener driver of claim 1, further comprising:

a workpiece contact bracket disposed on the nosepiece, the workpiece contact bracket including a workpiece contact bracket target; and a second sensor for detecting a location of the workpiece contact bracket target.

12. A method of operating a powered fastener driver, the method comprising:

monitoring a position of a fastener delivery mechanism;

determining whether the fastener delivery mechanism has moved from a fastener retrieval position to a fastener delivered position in which a fastener is properly loaded into a fastener driving channel; and allowing the powered fastener driver to fire when a trigger is actuated and when the fastener delivered position is detected, wherein the position of the fastener delivery mechanism is monitored by monitoring a location of a first rocker arm of the fastener delivery mechanism.

13. The method of claim 12, further comprising:
preventing the powered fastener driver from firing when the fastener delivered position is not detected.

14. The method of claim 13, wherein in response to the fastener delivered position not being detected, further comprising indicating that a fastener jam is likely to occur.

15. The method of claim 14, wherein indicating that a fastener jam is likely to occur includes providing a visual indication, an audible indication, haptic feedback, or a combination thereof.

16. The method of claim 12, wherein the first rocker arm includes a magnet disposed thereon.

17. The method of claim 16, wherein the location of the first rocker arm is determined by sensing the magnet on the first rocker arm.

18. The method of claim 12, wherein the first rocker arm includes a first metal target disposed therein.

19. The method of claim 18, wherein the first rocker arm includes a second metal target disposed therein.

20. The method of claim 19, wherein the location of the first rocker arm is determined by sensing the first metal target and the second metal target within the first rocker arm.

* * * * *